US008849492B2

(12) United States Patent
Uno

(10) Patent No.: US 8,849,492 B2
(45) Date of Patent: Sep. 30, 2014

(54) DRIVING ASSISTANCE APPARATUS

(75) Inventor: Satoshi Uno, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/496,248

(22) PCT Filed: May 17, 2010

(86) PCT No.: PCT/JP2010/058298
§ 371 (c)(1),
(2), (4) Date: Mar. 15, 2012

(87) PCT Pub. No.: WO2011/145165
PCT Pub. Date: Nov. 24, 2011

(65) Prior Publication Data
US 2013/0054049 A1 Feb. 28, 2013

(51) Int. Cl.
*B60W 40/08* (2012.01)
*B60W 50/00* (2006.01)
*B60W 30/18* (2012.01)
*G08G 1/16* (2006.01)

(52) U.S. Cl.
CPC ..... *B60W 50/0097* (2013.01); *B60W 30/18145* (2013.01); *B60W 40/08* (2013.01); *G08G 1/164* (2013.01); *Y02T 10/84* (2013.01); *B60W 2050/0089* (2013.01)
USPC .................................. 701/23; 701/36; 434/65

(58) Field of Classification Search
USPC .............. 701/1, 409, 93, 33.4, 36, 23; 434/65
See application file for complete search history.

(56) References Cited

U.S. PATENT DOCUMENTS

| 5,864,771 | A * | 1/1999 | Yokoyama et al. ............. 701/51 |
| 7,194,347 | B2 * | 3/2007 | Harumoto et al. ............. 701/45 |
| 8,538,619 | B2 * | 9/2013 | Syed et al. .................... 701/22 |
| 2002/0040265 | A1 * | 4/2002 | Sadano et al. ................. 701/41 |
| 2002/0128751 | A1 * | 9/2002 | Engstrom et al. ............... 701/1 |

(Continued)

FOREIGN PATENT DOCUMENTS

CN 1876462 12/2006
CN 101389521 3/2009

(Continued)

OTHER PUBLICATIONS

International Search Report in International Application No. PCT/JP2010/058298; Mailing Date: Aug. 17, 2010.

*Primary Examiner* — Fadey Jabr
*Assistant Examiner* — Courtney Heinle
(74) *Attorney, Agent, or Firm* — Finnegan, Henderson, Farabow, Garrett & Dunner, LLP

(57) ABSTRACT

A driving assistance apparatus is provided with: a storing device for storing each of a plurality of past driving situations of a self-vehicle as a group of a plurality of driving situation factors, for storing, correspondingly to each of the plurality of past driving situations, an action characteristic value and a driving situation occurrence frequency, and for storing, correspondingly to each of the plurality of driving situation factors, a factor influence value and a factor change frequency; an estimating device for estimating a future driving action of the driver on the basis of the plurality of past driving situations, the action characteristic value, the driving situation occurrence frequency, the factor influence value, and the factor change frequency; and a performing device for performing driving assistance in accordance with the estimated driving action.

6 Claims, 18 Drawing Sheets

(56) References Cited

U.S. PATENT DOCUMENTS

| | | | |
|---|---|---|---|
| 2003/0050742 A1* | 3/2003 | Sakamoto et al. | 701/1 |
| 2005/0159851 A1* | 7/2005 | Engstrom et al. | 701/1 |
| 2006/0122749 A1* | 6/2006 | Phelan et al. | 701/35 |
| 2006/0293819 A1 | 12/2006 | Harumoto et al. | |
| 2007/0010933 A1* | 1/2007 | Hochkirchen et al. | 701/117 |
| 2008/0004806 A1* | 1/2008 | Kimura et al. | 701/301 |
| 2008/0059036 A1* | 3/2008 | Imai et al. | 701/93 |
| 2009/0082917 A1* | 3/2009 | Adachi | 701/33 |
| 2009/0088941 A1* | 4/2009 | Tsuchiya et al. | 701/93 |
| 2009/0234552 A1* | 9/2009 | Takeda et al. | 701/96 |
| 2009/0306880 A1* | 12/2009 | Gomi et al. | 701/117 |
| 2010/0030397 A1* | 2/2010 | Tachibana et al. | 701/1 |
| 2010/0209890 A1* | 8/2010 | Huang et al. | 434/65 |
| 2010/0238009 A1* | 9/2010 | Cook et al. | 340/439 |
| 2010/0274435 A1* | 10/2010 | Kondoh et al. | 701/29 |
| 2011/0208399 A1* | 8/2011 | Fekete et al. | 701/93 |
| 2012/0133497 A1* | 5/2012 | Sasaki | 340/425.5 |
| 2013/0013164 A1* | 1/2013 | Taguchi | 701/96 |
| 2013/0054049 A1 | 2/2013 | Uno | |
| 2013/0073122 A1* | 3/2013 | Hoshiya | 701/2 |

FOREIGN PATENT DOCUMENTS

| | | |
|---|---|---|
| JP | 2005-202512 | 7/2005 |
| JP | 2006-232172 | 9/2006 |
| JP | 2006-344032 | 12/2006 |
| JP | 2007-164432 | 6/2007 |
| JP | 2008-74231 | 4/2008 |
| JP | 2009-134496 | 6/2009 |
| JP | 2009-151801 | 7/2009 |
| JP | 2009-237937 | 10/2009 |
| JP | 2009-245149 | 10/2009 |
| WO | WO 2011/145165 | 11/2011 |

* cited by examiner

FIG. 4

| Classification | Factor | Driving situation | | | | | Factor influence value | Factor influence frequency |
|---|---|---|---|---|---|---|---|---|
| | | 1 | 2 | 3 | 4 | ... | | |
| Road / structure information | Speed limit | 50 | 50 | 50 | 50 | ... | E1 | Ec1 |
| | Guardrail | None | None | None | None | ... | E2 | Ec2 |
| | Road surface condition | Dry | Dry | Wet | Wet | ... | E3 | Ec3 |
| | Traffic light color | Green | Red | Green | Red | ... | E4 | Ec4 |
| | ... | ... | ... | ... | ... | ... | ... | ... |
| Action characteristic value | | A1 | A2 | A3 | A4 | ... | | |
| Encounter frequency | | Ac1 | Ac2 | Ac3 | Ac4 | ... | | |
| ... | | | | | | | | |

| Classification | Factor | Driving situation | | | | | Factor influence value | Factor influence frequency |
|---|---|---|---|---|---|---|---|---|
| | | 1 | 2 | 3 | 4 | ... | | |
| Road/structure information | Speed limit | 50 | 50 | 50 | 50 | ... | E1 | Ec1 |
| | Guardrail | None | None | None | None | ... | E2 | Ec2 |
| Driving environment information | Weather | Sunny | Sunny | Rainy | Rainy | ... | E5 | Ec5 |
| | Another vehicle estimation result | Action α | Action β | Action α | Action β | ... | E6 | Ec6 |
| | ... | ... | ... | ... | ... | ... | ... | ... |
| | Action characteristic value | A1 | A2 | A3 | A4 | ... | | |
| | Encounter frequency | Ac1 | Ac2 | Ac3 | Ac4 | ... | | |
| ... | | | | | | | | |

| Classification | Factor | Driving situation 1 | 2 | 3 | 4 | ... | Factor influence value | Factor influence frequency |
|---|---|---|---|---|---|---|---|---|
| Road/structure information | Speed limit | 50 | 50 | 50 | 50 | ... | Moderate (initial value) | 0 |
| | Guardrail | None | None | None | None | ... | Moderate (initial value) | 0 |
| | Road surface condition | Dry | Dry | Wet | Wet | ... | Low | 10 |
| | Traffic light color | Green | Red | Green | Red | ... | High | 20 |
| ... | ... | ... | ... | ... | ... | ... | | |
| | Action characteristic value | A1 | A2 (≠A1) | A3 (≅A1) | 0 (initial value) | ... | | |
| | Encounter frequency | 30 times (50%) | 20 times (33%) | 10 times (17%) | 0 times (0%) | ... | | |

| Classification | Factor | Driving situation | | | | ... | Factor influence value | Factor influence frequency |
|---|---|---|---|---|---|---|---|---|
| | | 1 | 2 | 3 | 4 | | | |
| Road/structure information | Speed limit | 50 | 50 | 50 | 50 | ... | E1 | Ec1 |
| | Guardrail | None | None | None | None | ... | E2 | Ec2 |
| | Road surface condition | Dry | Dry | Wet | Wet | ... | E3 | Ec3 |
| | Traffic light color | Green | Red | Green | Red | ... | E4 | Ec4 |
| ... | ... | ... | ... | ... | ... | ... | ... | ... |
| | Action characteristic value | A1 | A2 | A3 | 0 (initial value) | ... | | |
| | Encounter frequency | 30 times (50%) | 20 times (33%) | 10 times (17%) | 0 times (0%) | | | |

| Classification | Factor | Driving situation | | | | | Factor influence value | Factor influence frequency |
|---|---|---|---|---|---|---|---|---|
| | | 1 | 2 | 3 | 4 | ... | | |
| Road/structure information | Intersection | Intersection Q | Intersection Q | Intersection Q | Intersection Q | ... | — | Ec1 |
| Driving environment information | Time period | Daytime | Daytime | Nighttime | Nighttime | ... | | Ec2 |
| | Weather | Sunny | Rainy | Sunny | Rainy | ... | Large | Ec3 |
| | ... | ... | ... | ... | ... | ... | Small | Ec4 |
| | | | | | | | ... | ... |
| Action characteristic value (Remaining distance upon accelerator OFF) | | A1=100 | A2=105 (≒A1) | A3=150 (≠A1) | 0 (initial value) | ... | | |
| Encounter frequency | | 30 times (50%) | 20 times (33%) | 10 times (17%) | 0 times (0%) | ... | | |

| Classification | Factor | Driving situation | | | | | Factor influence value | Factor influence frequency |
|---|---|---|---|---|---|---|---|---|
| | | 1 | 2 | 3 | 4 | ... | | |
| Driving environment information | Speed limit | 60 | 60 | 60 | 60 | ... | E1 | Ec1 |
| | Distance between intersections | 100 | 200 | 400 | 600 | ... | E2 | Ec2 |
| | Road surface condition | Dry | Dry | Dry | Dry | ... | E3 | Ec3 |
| | Traffic light color | Red | Red | Red | Red | ... | E4 | Ec4 |
| Driving environment information | Weather | Sunny | Sunny | Sunny | Sunny | ... | E5 | Ec5 |
| | Another vehicle | None | None | None | None | ... | E6 | Ec6 |
| | ... | ... | ... | ... | ... | ... | ... | ... |
| | Action characteristic value (Transition action) | Deceleration/stop | Deceleration/stop | Crusing | Crusing | ... | | |
| | Encounter frequency | Ac1 | Ac2 | Ac3 | Ac4 | ... | | |

| Classification | Factor | Driving situation | | | | | Factor influence value | Factor influence frequency |
|---|---|---|---|---|---|---|---|---|
| | | 1 | 2 | 3 | 4 | ••• | | |
| Driving environment information | Speed limit | 60 | 60 | 60 | 60 | ••• | E1 | Ec1 |
| | Distance between intersections | 600 | 400 | 200 | 100 | ••• | E2 | Ec2 |
| | Road surface condition | Dry | Dry | Dry | Dry | ••• | E3 | Ec3 |
| | Traffic light color | Red | Red | Red | Red | ••• | E4 | Ec4 |
| Driving environment information | Weather | Sunny | Sunny | Sunny | Sunny | ••• | E5 | Ec5 |
| | Time period | Daytime | Daytime | Daytime | Daytime | ••• | E6 | Ec6 |
| ••• | ••• | ••• | ••• | ••• | ••• | ••• | | |
| | Action characteristic value (Top vehicle speed characteristics) | 55km/h, 120~ 440m, 17~36s | 55km/h, 135~ 250m, 14~21s | 44km/h, 66~ 110m, 10~12s | 34km/h, 36~ 50m, 8~9s | ••• | | |
| | Encounter frequency | Ac1 | Ac2 | Ac3 | Ac4 | ••• | | |

900

DRIVING ASSISTANCE APPARATUS

CROSS-REFERENCE TO RELATED APPLICATIONS

This application is a national phase application of International Application No. PCT/JP2010/058298, filed May 17, 2010, the contents of which are incorporated herein by reference.

TECHNICAL FIELD

The present invention relates to a driving assistance apparatus for performing driving assistance for a vehicle.

BACKGROUND ART

As this type of driving assistance apparatus, an apparatus for performing the driving assistance on the basis of a past vehicle state (in other words, a past driving situation of the vehicle) stored (e.g. refer to a patent document 1). For example, the patent document 1 discloses a technology in which a vehicle state in passing through a curve ahead of the vehicle is estimated on the basis of a current position of the vehicle, curve information about the curve ahead of the vehicle, and a current vehicle state, in which a driver's acceptable vehicle state in passing through the curve is estimated on the basis of the stored past vehicle state in passing through the curve, and in which it is judged whether or not the driving assistance in the curve is performed on the basis of the estimated vehicle state in passing through the curve ahead of the vehicle and the driver's acceptable vehicle state in passing through the curve.

PRIOR ART DOCUMENT

Patent Document

Patent document 1: Japanese Patent Application Laid Open No. 2008-74231

DISCLOSURE OF INVENTION

Subject to be Solved by the Invention

On the driving assistance apparatus for performing the driving assistance on the basis of the past vehicle state as described above, for example, if the future driving action of the driver is estimated on the basis of the past vehicle state and if it is tried to perform the driving assistance in accordance with the estimated driving action, there is such a technical problem that an estimation accuracy of estimating the future driving action of the driver is likely reduced, for example, because the past vehicle state includes a special vehicle state.

In view of the aforementioned problems, it is therefore an object of the present invention to provide a driving assistance apparatus capable of estimating the future driving action of a driver and appropriately performing the driving assistance.

Means for Solving the Subject

The above object of the present invention can be achieved by a driving assistance apparatus, mounted on a self-vehicle, for performing driving assistance for a driver of the self-vehicle, said driving assistance apparatus provided with: a storing device for storing each of a plurality of past driving situations of the self-vehicle as a group of a plurality of driving situation factors, for storing, correspondingly to each of the plurality of past driving situations, an action characteristic value indicating an action characteristic of the driver in the past driving situation and a driving situation occurrence frequency indicating a frequency at which the past driving situation occurs, and for storing, correspondingly to each of the plurality of driving situation factors, a factor influence value indicating extent of an influence of the driving situation factor on the action characteristic and a factor change frequency indicating a frequency at which the driving situation factor changes; an estimating device for estimating a future driving action of the driver on the basis of the plurality of past driving situations, the action characteristic value, the driving situation occurrence frequency, the factor influence value, and the factor change frequency; and a performing device for performing the driving assistance in accordance with the estimated driving action.

According to the driving assistance apparatus of the present invention, in its operation, the current driving situation of the self-vehicle is stored by the storing device in a storage destination such as, for example, an in-vehicle database mounted on the self-vehicle or a remote database disposed at a different place from the self-vehicle, as the past driving situation, in each predetermined period or in accordance with the driver's indication.

The storing device stores the past driving situation as a group of the plurality of driving situation factors such as, for example, a speed limit, a road surface condition, and a traffic light color. Moreover, the storing device stores the action characteristic value and the driving situation occurrence frequency correspondingly to the past driving situation. The action characteristic value is a value indicating the action characteristic of the driver in the past driving situation (e.g. a characteristic of having a tendency to perform an operation of accelerating the self-vehicle, a characteristic of performing an operation to make a right turn, etc.). The driving situation occurrence frequency is a value indicating the frequency at which the past driving situation occurs (in other words, the number of times to encounter the past driving situation), and it may be a value including the date of occurrence of the past driving situation. In addition, the storing device stores the factor influence value and the factor change frequency correspondingly to the driving situation factor. The factor influence value is a value indicating the influence of the driving situation factor on the action characteristic of the driver, and it can be determined in accordance with how the driver's action changes if the driving situation factor changes. For example, since the driver performs an operation of accelerating the self-vehicle from a stop state if the traffic light color as the driving situation factor changes from red to green, the factor influence value corresponding to the traffic light color as the driving situation factor may be set to be relatively high. The factor change frequency is a value indicating the frequency at which the driving situation factor changes (in other words, the number of times to encounter the change in the driving situation factor), and it may include the date of the change in the driving situation factor.

The estimating device estimates the future driving action of the driver on the basis of the plurality of past driving situations, the action characteristic value, the driving situation occurrence frequency, the factor influence value, and the factor change frequency which are stored by the storing device. Thus, since it is possible to estimate the future driving action of the driver in view of the driving situation occurrence frequency, the factor influence value, and the factor change frequency, such as estimating the future driving action of the driver to the exclusion of a special driving situation with a low driving situation occurrence frequency (e.g. a driving situation caused by the presence of a stopped vehicle, a driving situation caused by a pedestrian rushing out in front of a vehicle, etc.), it is possible to accurately estimate the future driving action of the driver.

The performing device performs the driving assistance in accordance with the driving action estimated by the estimating device. Thus, it is possible to perform the drive assistance suitable for the future driving action of the driver.

As explained above, according to the driving assistance apparatus of the present invention, it is possible to accurately estimate the future driving action of the driver on the basis of the plurality of past driving situations, the action characteristic value, the driving situation occurrence frequency, the factor influence value and the factor influence frequency, and it is possible to appropriately perform the driving assistance.

In one aspect of the driving assistance apparatus of the present invention, the storing device has an in-vehicle database mounted on the self-vehicle and a remote database disposed at a different place from the self-vehicle, as a storage destination for storing the plurality of past driving situations, the action characteristic value, the driving situation occurrence frequency, the factor influence value, and the factor change frequency.

According to this aspect, the plurality of past driving situations can be distributed and stored in the in-vehicle database and the remote database. For example, by storing a past driving situation with a high driving situation occurrence frequency in the in-vehicle database and by storing a past driving situation with a low driving situation occurrence frequency in the remote database, the estimating device can quickly refer to the past driving situation with a high driving situation occurrence frequency (i.e. it is possible to reduce an access time necessary for the estimating device to access the past driving situation with a high driving situation occurrence frequency). At the same time, it is possible to avoid a situation in which the past driving situation cannot be added due to too much information stored in the in-vehicle database.

In the aspect in which the storing device has the in-vehicle database and the remote database, as described above, the driving assistance apparatus may be further provided with an information transferring device for transferring to the remote database a past driving situation in which the driving situation occurrence frequency is less than a predetermined first reference frequency out of the plurality of past driving situations stored in the in-vehicle database if an information amount associated with the plurality of past driving situations, the action characteristic value, the driving situation occurrence frequency, the factor influence value, and the factor change frequency which are stored in the in-vehicle database, is greater than or equal to a predetermined reference information amount.

In this case, the plurality of past driving situations can be certainly distributed and stored in the in-vehicle database and the remote database by the information transferring device.

In another aspect of the driving assistance apparatus of the present invention, one of the plurality of driving situation factors is another vehicle factor indicating a future driving action of another vehicle received from the another vehicle which drives around the self-vehicle, and the driving assistance apparatus is further provided with an another vehicle reliability setting device for setting reliability indicating probability of the another vehicle factor in accordance with whether or not driving assistance for a driver of the another vehicle is performed on the another vehicle.

According to this aspect, for example, the estimating device can estimate the future driving action of the driver on the basis of the reliability set by the another vehicle reliability setting device and can estimate the future action of the driver, more accurately. In other words, for example, by estimating the future driving action of the driver on the basis of the past driving situation including another vehicle factor in which the reliability is greater than predetermined reference reliability to the exclusion of the past driving situation including another vehicle factor in which the reliability is less than the predetermined reference reliability, it is possible to estimate the future driving action of the driver, more accurately.

In another aspect of the driving assistance apparatus of the present invention, when estimating the driving action on the basis of one past driving situation in which the driving situation occurrence frequency is less than a predetermined second reference frequency out of the plurality of past driving situations, the estimating device estimates the driving action on the basis of another past driving situation in which a driving situation factor providing the factor influence value that is greater than a predetermined threshold value out of the plurality of driving situation factors is the same as that in the one past driving situation and in which the driving situation occurrence frequency is greater than the predetermined second reference frequency, instead of the one past driving situation.

According to this aspect, the estimating device estimates the driving action on the basis of the another past driving situation which is similar to the one past driving situation and in which the driving situation occurrence frequency is higher, instead of the one past driving situation predicted as a special (or rare) driving situation because the driving situation occurrence frequency is less than the predetermined second reference frequency. Thus, it is possible to estimate the future driving action of the driver, more accurately.

In another aspect of the driving assistance apparatus of the present invention, the estimating device estimates as the driving action a first driving action and a second driving action performed after the first driving action, and the performing device performs the driving assistance in accordance with the estimated first and second driving actions.

According to this aspect, when the driving assistance according to the first driving action is performed, the driving assistance is also performed in accordance with the second driving action estimated to be performed after the first driving action. Thus, it is possible to perform the driving assistance more suitable for a series of the future driving actions of the driver which consists of the first and second driving actions.

In another aspect of the driving assistance apparatus of the present invention, the storing device stores as the action characteristic value a top vehicle speed reaching time which is a time from when the self-vehicle starts to accelerate to when the self-vehicle reaches a top vehicle speed, and the estimating device estimates a driving action performed after the self-vehicle starts to accelerate, on the basis of the top vehicle speed reaching time.

According to this aspect, for example, on the basis of the top vehicle speed reaching time obtained from when the self-vehicle starts to accelerate from a first intersection to a second intersection, the driving action performed near the second intersection after the start/acceleration is estimated by the estimating device. Here, according to a study by the present inventors, for example, it is found that the driving action performed after the self-vehicle starts to accelerate from the first intersection to the second intersection tends to be strongly related to the top vehicle speed reaching time, i.e. that the top vehicle speed reaching time can be a preferable basis or ground in estimating the driving action performed after the self-vehicle starts to accelerate from the first intersection to the second intersection. Thus, according to this aspect, it is possible to accurately estimate the driving action performed after the self-vehicle starts to accelerate.

In another aspect of the driving assistance apparatus of the present invention, it is further provided with an obtaining device for obtaining each of the plurality of driving situation factors of the self-vehicle at a current time in each period according to a rate of change at which each of the plurality of driving situation factors changes.

According to this aspect, for example, the obtaining device obtains a driving situation factor with a relatively low rate of change (e.g. weather, etc.) out of the plurality of driving situation factors in each period that is relatively long and obtains a driving situation factor with a relatively high rate of change (e.g. a vehicle speed, etc.) out of the plurality of factor information in each period that is relatively short. Thus, it is possible to reduce that the driving situation factor with a relatively low rate of change (i.e. the driving situation factor that hardly changes or does not change at all in a relatively long time) is uselessly obtained, and it is also possible to certainly obtain the driving situation factor with a relatively high rate of change (i.e. the driving situation factor that changes in a relatively short time). Therefore, it is possible to accurately estimate the driving action while reducing the useless obtainment of the current driving situation factor.

Incidentally, a time interval at which each driving situation factor is obtained (i.e. a period between when the driving situation factor is obtained and when the factor information is obtained again) may be adjusted on the basis of the factor influence value. For example, in the case of the driving situation factor in which the rate of change is relatively high but whose factor influence value is relatively small (i.e. which has a relatively small influence on the action characteristic of the driver), the time interval at which the driving situation factor is obtained may be set to be relatively long. By such a configuration, the useless obtainment of the driving situation factor can be further reduced.

The operation and other advantages of the present invention will become more apparent from Mode for Carrying Out the Invention explained below.

BRIEF DESCRIPTION OF DRAWINGS

FIG. 4 is a schematic diagram showing the structure of an action characteristic management table of the driving assistance apparatus in the first embodiment.

FIG. 6 is a schematic diagram showing one example of another vehicle estimation result information stored as factor information on the action characteristic management table.

FIG. 9 is a schematic diagram (part 1) showing one example of an action characteristic value, an encounter frequency, a factor influence value, and a factor influence frequency which are stored on the action characteristic management table.

FIG. 13 is a schematic diagram (part 2) showing one example of the action characteristic value, the encounter frequency, the factor influence value, and the factor influence frequency which are stored on the action characteristic management table.

FIG. 15 is a schematic diagram showing an action characteristic management table in a second operation example.

FIG. 17 is a schematic diagram showing an action characteristic management table in a third operation example.

FIG. 18 is a schematic diagram showing an action characteristic management table in a fourth operation example.

MODE FOR CARRYING OUT THE INVENTION

Hereinafter, an embodiment of the present invention will be explained with reference to the drawings.

First Embodiment

A driving assistance apparatus in a first embodiment will be explained with reference to FIG. 1 to FIG. 13.

Firstly, the entire structure of the driving assistance apparatus in the embodiment will be explained with reference to FIG. 1.

Figure 1:
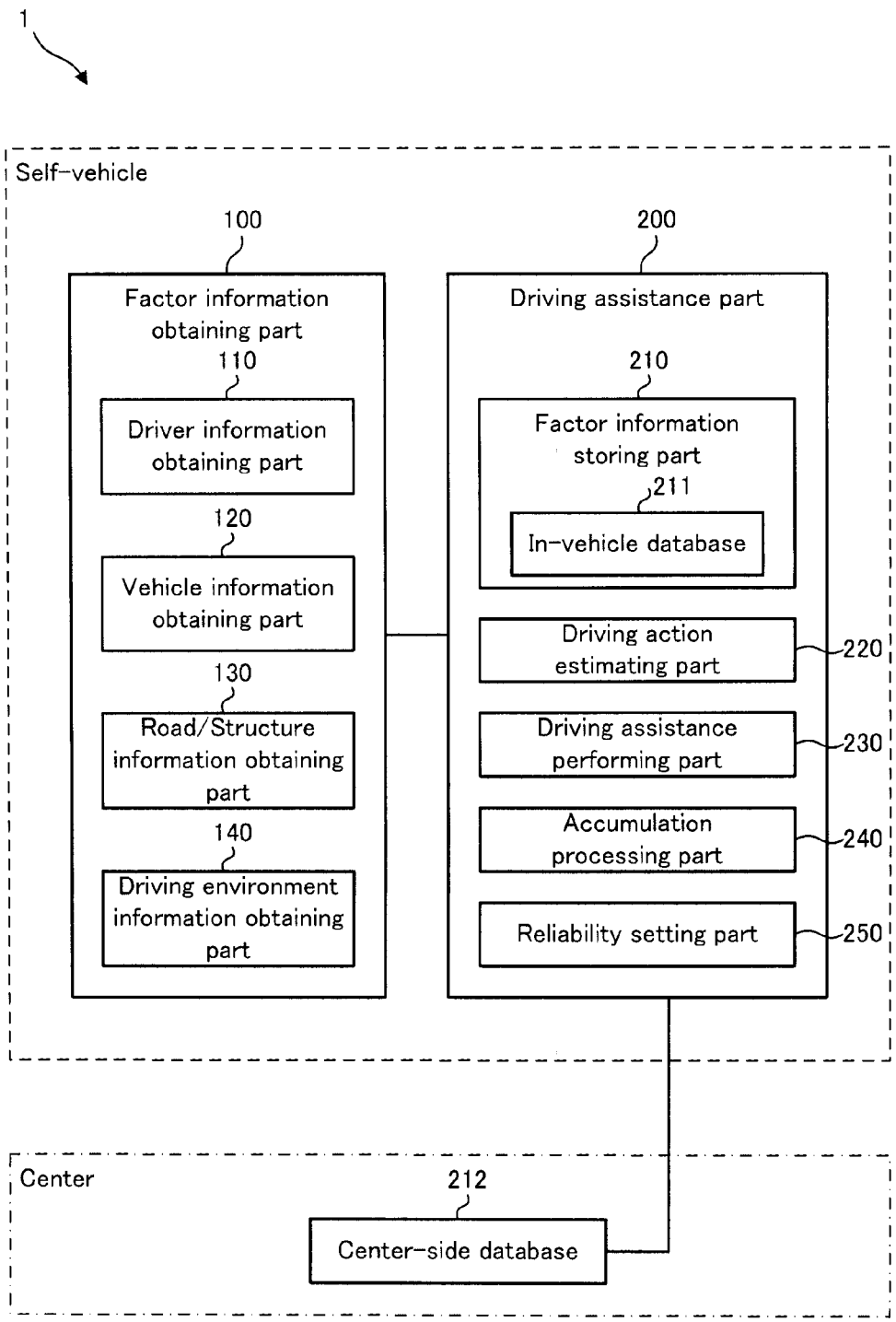
FIG. 1 is a block diagram showing the structure of a driving assistance apparatus in a first embodiment.

FIG. 1 is a block diagram showing the structure of the driving assistance apparatus in the embodiment.

In FIG. 1, a driving assistance apparatus 1 in the embodiment is mounted on a self-vehicle and performs driving assistance for the driver of the self-vehicle (e.g. control such as acceleration, braking, and steering of the self-vehicle). The driving assistance apparatus 1 is provided with a factor information obtaining part 100 and a driving assistance part 200.

The factor information obtaining part 100 can obtain information about the driving situation of the self-vehicle, and it is provided with a driver information obtaining part 110, a vehicle information obtaining part 120, a road/structure information obtaining part 130, and a driving environment information obtaining part 140.

The driver information obtaining part 110 includes, for example, an input apparatus capable of inputting the attribute of the driver (e.g. age, sex, height, weight, etc.), a sensor capable of detecting the consciousness or state of the driver, and the like, and it can obtain information about the driver (e.g. information indicating the attribute, consciousness, state, or the like of the driver). Incidentally, hereinafter, the information about the driver will be referred to as "driver information", as occasion demands.

The vehicle information obtaining part 120 is connected, for example, to a car navigation system installed in the self-vehicle, the engine control apparatus of the self-vehicle, and the like, and it can obtain information about the vehicle state of the self-vehicle (e.g. a current position of the self-vehicle, an accelerator opening degree, a braking pressure, a shift position, etc.). Incidentally, hereinafter, the information about the vehicle state of the self-vehicle will be referred to as "vehicle information", as occasion demands.

The road/structure information obtaining part 130 is connected, for example, to the car navigation system installed in the self-vehicle, and it includes a radar sensor, a camera sensor, and the like. The road/structure information obtaining part 130 can obtain information about a road on which the self-vehicle drives and its surrounding structures (e.g. the type of the road, a speed limit, the presence or absence of a guardrail, a road surface condition, etc.). Incidentally, hereinafter, the information about the road on which the self-vehicle drives and its surrounding structures will be referred to as "road/structure information", as occasion demands.

The driving environment information obtaining part 140 includes, for example, a radar sensor, a camera sensor, a vehicle-to-vehicle communication device, a pedestrian-to-vehicle communication device, and the like, and it can obtain information about an environment in which the self-vehicle drives (e.g. the number of other vehicles which drive around the self-vehicle, a following distance from another vehicle, weather, the state of a pedestrian who walks around the self-vehicle, etc.). Incidentally, the information about the environment in which the self-vehicle drives is referred to as "driving environment information", as occasion demands.

As described above, the factor information obtaining part 100 can obtain the information about the driving situation of the self-vehicle including the driver information, the vehicle information, the road/structure information, and the driving environment information described above, by using the car navigation system installed in the self-vehicle and various sensors.

The driving assistance part 200 includes a Central Processing Unit (CPU), a Read Only Memory (ROM), a Random Access Memory (RAM), a Hard Disk Drive (HDD), and the like, and it is provided with a factor information storing part 210, a driving action estimating part 220, a driving assistance performing part 230, an accumulation processing part 240, and a reliability setting part 250.

The factor information storing part 210 has an in-vehicle database 211 installed in the self-vehicle and a center-side database 212 provided for a center (facility) located at a different place from the self-vehicle. The factor information storing part 210 can store the information about the driving situation obtained by the factor information obtaining part 100 in the in-vehicle database 211 or the center-side database 212. In each of the in-vehicle database 211 or the center-side database 212, an action characteristic management table 900 described later with reference to FIG. 4 is defined, wherein the action characteristic management table 900 is for storing the information about the driving situation obtained by the factor information obtaining part 100. The factor information storing part 210 stores the information about the driving situation obtained by the factor information obtaining part 100, in the in-vehicle database 211 or the center-side database 212, as one portion of the action characteristic management table 900. Incidentally, this will be described later with reference to FIG. 4, but the factor information storing part 210 stores, as one portion of the action characteristic management table 900, an action characteristic value indicating the action characteristic of the driver in a past driving situation, an encounter frequency as one example of the "driving situation occurrence frequency" indicating a frequency at which the past driving situation occurs, a factor influence value indicating the extent of the influence of a driving situation factor on the action characteristic, and a factor influence frequency as one example of the "factor change frequency" of the present invention indicating a frequency at which the driving situation factor changes.

The driving action estimating part 220 estimates the future driving action of the driver of the self-vehicle on the basis of the information about a plurality of past driving situations, the action characteristic value, the encounter frequency, the factor influence value, and the factor influence frequency which are stored as one portion of the action characteristic management table 900 (refer to FIG. 4), in the in-vehicle database 211 or the center-side database 212.

The driving assistance performing part 230 performs the driving assistance for the driver of the self-vehicle in accordance with the driving action estimated by the driving action estimating part 220. The driving assistance performing part 230 controls the self-vehicle, for example, so as to realize the behavior of the self-vehicle in a case where the driving action estimated by the driving action estimating part 220 is performed, as the driving assistance. Alternatively, the driving assistance performing part 230 performs ecology driving assistance for guiding the driver, for example, such that an accelerator is made off earlier than the off-timing of the accelerator estimated as the driving action by the driving action estimating part 220, as the driving assistance.

The accumulation processing part 240 performs an accumulating process including an updating process of updating e.g. the action characteristic value, the encounter frequency, and the like on the action characteristic management table 900 (refer to FIG. 4) and an accumulated information sorting process of sorting the information accumulated in the in-vehicle database 211. Incidentally, the accumulating process, the updating process, and the accumulated information sorting process will be explained in detail later with reference to FIG. 10, FIG. 11, and FIG. 12, respectively. Incidentally, the accumulation processing part 240 is one example of the "information transferring device" of the present invention.

The reliability setting part 250 is one example of the "another vehicle reliability setting device" of the present invention, and it performs a reliability setting process of setting reliability, which indicates the probability of another vehicle estimation result information, on this another vehicle estimation result information obtained by the factor information obtaining part 100 (more specifically, the driving environment information obtaining part 140). The another vehicle estimation result information is one example of the "another vehicle factor" of the present invention and is information indicating the future driving action of another vehicle (i.e. the driving action estimated to be adopted by the another vehicle) which is received by the driving environment information obtaining part 140 (more specifically, the vehicle-to-vehicle communication device included in the driving environment information obtaining part 140) from the another vehicle which drives around the self-vehicle. Incidentally, the reliability setting process performed by the reliability setting part 250 will be explained in detail later with reference to FIG. 5.

First Operation Example

Next, a first operation example of the driving assistance apparatus in the embodiment will be explained with reference to FIG. 2 to FIG. 13.

Figure 2:
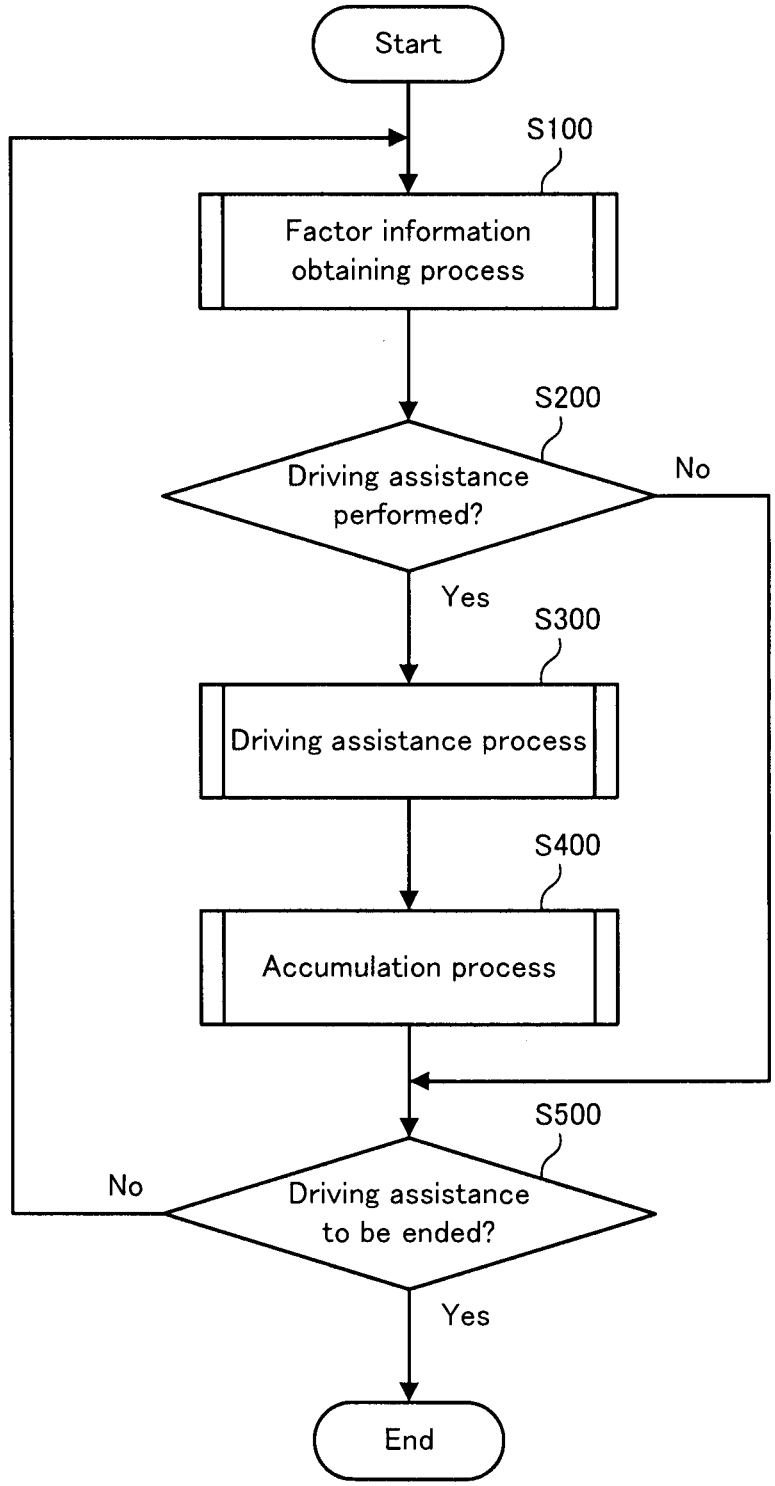
FIG. 2 is a flowchart showing a flow of main operations of the driving assistance apparatus in the first embodiment.

FIG. 2 is a flowchart showing a flow of main operations of the driving assistance apparatus in the embodiment.

In FIG. 2, in operation of the driving assistance apparatus 1, firstly, a factor information obtaining process is performed (step S100).

Figure 3:
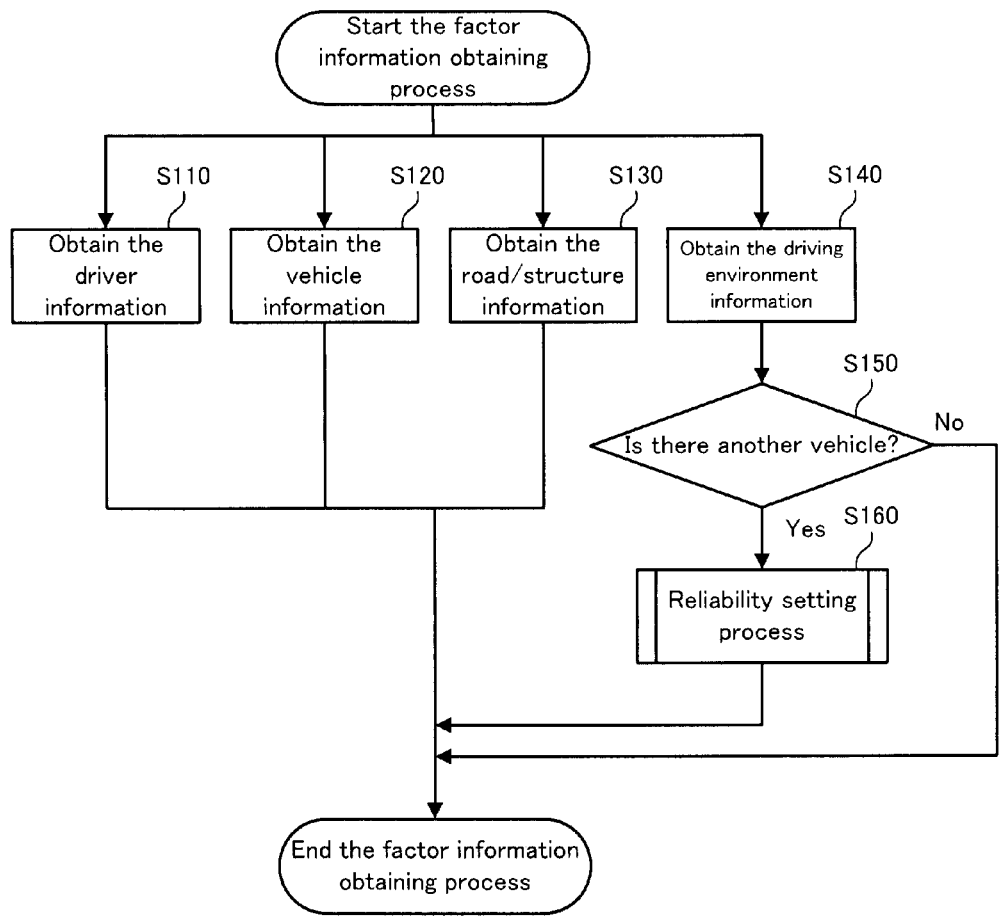
FIG. 3 is a flowchart showing a flow of a factor information obtaining process performed by the driving assistance apparatus in the first embodiment.

FIG. 3 is a flowchart showing a flow of the factor information obtaining process performed by the driving assistance apparatus in the embodiment.

As shown in FIG. 3, in the factor information obtaining process, the driver information is obtained by the driver information obtaining part 110 (refer to FIG. 1) (step S110). Moreover, in parallel with or in tandem with the process of obtaining the driver information (i.e. the process operation in the step S110), the vehicle information is obtained by the vehicle information obtaining part 120 (refer to FIG. 1) (step S120), the road/structure information is obtained by the road/structure information obtaining part 130 (refer to FIG. 1) (step S130), and the driving environment information is obtained by the driving environment information obtaining part 140 (refer to FIG. 1) (step S140). The obtained driver information, the vehicle information, the road/structure information, and the driving environment information are stored as one portion of the action characteristic management table 900 (refer to FIG. 4) in the in-vehicle database 211 by the factor information storing part 210 (refer to FIG. 1). Incidentally, hereinafter, if it is not necessary to distinctly explain the driver information, the vehicle information, the road/structure information, and the driving environment information, then, the driver information, the vehicle information, the road/structure information, and the driving environment information are collectively referred to as the "information about the driving situation" for explanation.

FIG. 4 is a schematic diagram showing the structure of the action characteristic management table of the driving assistance apparatus in the embodiment.

In FIG. 4, in the in-vehicle database 211 (refer to FIG. 1), the action characteristic management table 900 is used to manage the information about the driving situation, as well as the action characteristic value, the encounter frequency, the factor influence value, and the factor influence frequency described later.

On the action characteristic management table 900, information about one driving situation (in other words, each of the plurality of past driving situations) is stored (or managed) as a group of a plurality of factor information. Here, the factor information means each of the various information obtained by the factor information obtaining part 100 described with reference to FIG. 1, and it indicates each of the plurality of factors that define the one driving situation. In the example shown in FIG. 4, as the factor information, information about a speed limit, information about a guardrail, information about a road surface condition, and information about a traffic light color are shown. The information about one driving situation is stored as a group of the plurality of factor information including the information about the speed limit, the information about the guardrail, the information about the road surface condition, and the information about the traffic light color. In the example in FIG. 4, information about each of a first driving situation, a second driving situation, a third driving situation, and a fourth driving situation is stored on the action characteristic management table 900. Here, in the first driving situation, the speed limit on the road is 50 km/h, there is no guardrail on the road, the road surface condition is dry, and the traffic light color is green. In the second driving situation, the speed limit on the road is 50 km/h, there is no guardrail on the road, the road surface condition is dry, and the traffic light color is red. In the third driving situation, the speed limit on the road is 50 km/h, there is no guardrail on the road, the road surface condition is wet, and the traffic light color is green. In the fourth driving situation, the speed limit on the road is 50 km/h, there is no guardrail on the road, the road surface condition is wet, and the traffic light color is red. Incidentally, all the information about the speed limit, the information about the guardrail, the information about the road surface condition, and the information about the traffic light color are the information obtained by the road/structure information obtaining part 130 (i.e. the road/structure information). On the action characteristic management table 900, a difference among the driver information, the vehicle information, the road/structure information, and the driving environment information is managed as "classification".

Moreover, the action characteristic management table 900 stores the action characteristic value and the encounter frequency correspondingly to one driving situation. The action characteristic value is a value indicating the action characteristic of the driver in the driving situation corresponding to the action characteristic value (e.g. a characteristic of having a tendency to perform an operation of accelerating the self-vehicle, a characteristic of performing an operation to make a right turn, etc.). The encounter frequency is a value indicating a frequency at which the driving situation corresponding to the encounter frequency occurs (in other words, the number of times to encounter the driving situation), and it may be a value including the date of occurrence of the driving situation or the like. The action characteristic value and the encounter frequency are stored by the factor information storing part 210, and each of their initial values is set, for example, to zero (0). The action characteristic value and the encounter frequency are updated by the updating process described later with reference to FIG. 11. Incidentally, in the example in FIG. 4, for convenience of explanation, the action characteristic value corresponding to the first driving situation is shown as "A1", the action characteristic value corresponding to the second driving situation is shown as "A2", the action characteristic value corresponding to the third driving situation is shown as "A3", and the action characteristic value corresponding to the fourth driving situation is shown as "A4". Moreover, in the example in FIG. 4, for convenience of explanation, the encounter frequency corresponding to the first driving situation is shown as "Ac1", the encounter frequency corresponding to the second driving situation is shown as "Ac2", the encounter frequency corresponding to the third driving situation is shown as "Ac3", and the encounter frequency corresponding to the fourth driving situation is shown as "Ac4".

In addition, the action characteristic management table 900 stores the factor influence value and the factor influence frequency correspondingly to one factor information (i.e. each of the plurality of factor information). The factor influence value is a value indicating the extent of an influence of the factor information corresponding to the factor influence value on the action characteristic of the driver, and it is determined in accordance with how the driver's action changes if the factor information changes. For example, since the driver changes from an operation of stopping the self-vehicle to an operation of accelerating it if the traffic light color changes from red to green, the factor influence value corresponding to the "traffic light color" as the factor information may be set to be relatively high. The factor influence frequency is a value indicating a frequency at which the factor information changes (in other words, the number of times to encounter the change in the factor information, for example, the number of times the traffic light color is changed), and it may include the date of the change in the factor information. The factor influence value and the factor influence frequency are stored by the factor information storing part 210. The factor influence value is updated, for example, in accordance with a change in the action characteristic value with respect to the change in the factor information corresponding to the factor influence value. The factor influence frequency is updated (specifically, for example, counted up by 1) if the factor information changes. Incidentally, in the example in FIG. 4, for convenience of explanation, the factor influence value corresponding to the "speed limit" as the factor information is shown as "E1", the factor influence value corresponding to the "guardrail" as the factor information is shown as "E2", the factor influence value corresponding to the "road surface condition" as the factor information is shown as "E3", and the factor influence value corresponding to the "traffic light color" as the factor information is shown as "E4". Moreover, in the example in FIG. 4, for convenience of explanation, the factor influence frequency corresponding to the "speed limit" as the factor information is shown as "Ec1", the factor influence frequency corresponding to the "guardrail" as the factor information is shown as "Ec2", the factor influence frequency corresponding to the "road surface condition" as the factor information is shown as "Ec3", and the factor influence frequency corresponding to the "traffic light color" as the factor information is shown as "Ec4".

In FIG. 3 again, after the process of obtaining the driving environment information (i.e. the process operation in the step S140), it is judged whether or not there is another vehicle (step S150). Specifically, it is judged by the driving assistance part 200 (refer to FIG. 1) whether or not the presence of another vehicle around the self-vehicle is detected by the radar sensor, the camera sensor, or the vehicle-to-vehicle communication device included in the driving environment information obtaining part 140 (refer to FIG. 1).

If it is judged that there is no other vehicle (the step S150: No), the factor information obtaining process is ended.

If it is judged that there is another vehicle (the step S150: Yes), the reliability setting process is performed (step S160).

Figure 5:
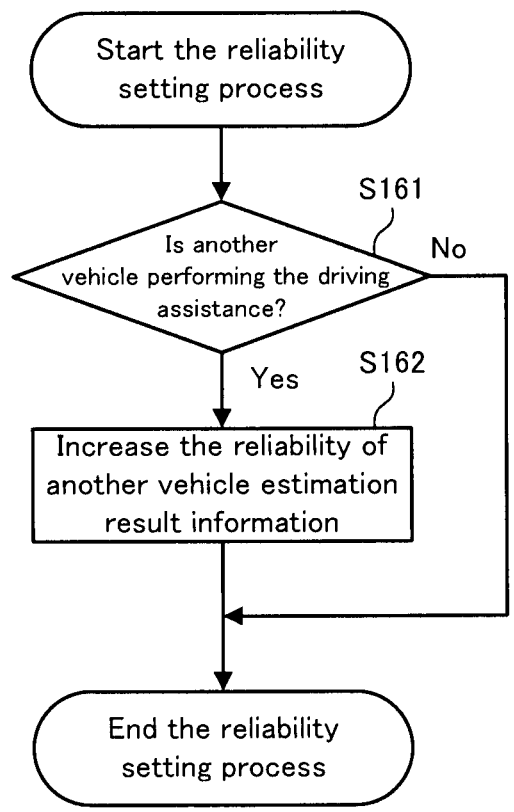
FIG. 5 is a flowchart showing a flow of a reliability setting process performed by the driving assistance apparatus in the first embodiment.

FIG. 5 is a flowchart showing a flow of the reliability setting process performed by the driving assistance apparatus in the embodiment.

As shown in FIG. 5, in the reliability setting process, firstly, it is judged whether or not the another vehicle is performing the driving assistance (step S161). In other words, it is judged by the reliability setting part 250 whether or not the driving assistance for the driver of the another vehicle is performed on the another vehicle.

If it is judged that the another vehicle is not performing the driving assistance (the step S161: No), the reliability setting process is ended.

If it is judged that the another vehicle is performing the driving assistance (the step S161: Yes), the reliability setting part 250 increases the reliability of the another vehicle estimation result information (step S162). Incidentally, as described above, the another vehicle estimation result information is information indicating the future driving action of the another vehicle (i.e. the driving action to be estimated to be adopted by the another vehicle), which is received by the driving environment information obtaining part 140 (more specifically, the vehicle-to-vehicle communication device included in the driving environment information obtaining part 140) from the another vehicle which drives around the self-vehicle.

FIG. 6 is a schematic diagram showing one example of the another vehicle estimation result information stored as the factor information on the action characteristic management table.

In FIG. 6, the another vehicle estimation result information (i.e. an "another vehicle estimation result") as the factor information is stored in a column L1 of the action characteristic management table 900. In the example in FIG. 6, the another vehicle estimation result information in the first driving situation is an "action α", the another vehicle estimation result information in the second driving situation is an "action β", the another vehicle estimation result information in the third driving situation is an "action α", and the another vehicle estimation result information in the fourth driving situation is an "action β". In other words, in the example in FIG. 6, the another vehicle estimation result information in the first driving situation and the another vehicle estimation result information in the third driving situation are equal to each other, and the another vehicle estimation result information in the second driving situation and the another vehicle estimation result information in the fourth driving situation are equal to each other.

Incidentally, in FIG. 6, weather information (i.e. "weather") as the factor information is stored in one portion of the action characteristic management table 900. In the example in FIG. 6, the weather information in the first driving situation is "sunny", the weather information in the second driving situation is "sunny", the weather information in the third driving situation is "rainy", and the weather information in the fourth driving situation is "rainy". Moreover, in the example in FIG. 6, for convenience of explanation, the factor influence value corresponding to the "weather" as the factor information is shown as "E5", and the factor influence value corresponding to the "another vehicle estimation result" as the factor information is shown as "E6". Moreover, in the example in FIG. 6, for convenience of explanation, the factor influence frequency corresponding to the "weather" as the factor information is shown as "Ec5", and the factor influence frequency corresponding to the "another vehicle estimation result" as the factor information is shown as "Ec6".

In FIG. 5 and FIG. 6, as described above, if it is judged that the another vehicle is performing the driving assistance (the step S161: Yes), the reliability setting device 250 increases the reliability of the another vehicle estimation result information (the step S162). Here, the reliability of the another vehicle estimation result information is set by the reliability setting device 250 for each another vehicle estimation result information (i.e. for each driving situation), as a value indicating the probability of the another vehicle estimation result information. The initial value of the reliability of the another vehicle estimation result information in each driving situation is set, for example, to zero (0).

Incidentally, if it is judged that the another vehicle is performing the driving assistance (the step S161: Yes), the reliability setting device 250 judges that the another vehicle estimation result information obtained at that time point is highly reliable, and it increases or raises the reliability of the another vehicle estimation result information (the step S162). For example, in the example in FIG. 6, if the "action α" which is the another vehicle estimation result information in the first driving situation is obtained by the driving environment information obtaining part 140 when the another vehicle is performing the driving assistance, the reliability of the "action α" which is the another vehicle estimation result information in the first driving situation is raised by the reliability setting part 250.

As described above, particularly in the embodiment, since the reliability is set by the reliability setting part 250 for the another vehicle estimation result information, the driving action estimating part 220 (refer to FIG. 1) can accurately estimate the future driving action of the driver on the basis of the reliability. In other words, for example, by estimating the future driving action of the driver on the basis of the driving situation including the "another another vehicle estimation result" with reliability higher than predetermined reference reliability except the driving situation including the "another another vehicle estimation result" with reliability lower than the predetermined reference reliability, it is possible to estimate the future driving action of the driver, accurately.

In FIG. 2 again, after the factor information obtaining process (the step S100), it is judged by the driving assistance part 200 whether or not the driving assistance is performed (step S200). Specifically, the driving assistance part 200 judges whether or not the driving assistance is performed in accordance with whether or not an indication of performing the driving assistance is given by the driver of the self-vehicle. In other words, the driving assistance part 200 judges that the driving assistance is performed if there is the indication of performing the driving assistance, and it judges that the driving assistance is not performed if there is no indication of performing the driving assistance.

Incidentally, this operation example exemplifies and explains a case where after the factor information obtaining process (the step S100), a driving assistance process (step S300) and an accumulating process (step S400) described later are performed in order; however, the accumulating process (the step S400) may be performed in predetermined timing (e.g. regularly), regardless of whether or not the driving assistance process (the step S300) is performed after the factor information obtaining process (the step S100).

If it is judged that the driving assistance is performed (the step S200: Yes), the driving assistance process is performed (the step S300).

Figure 7:
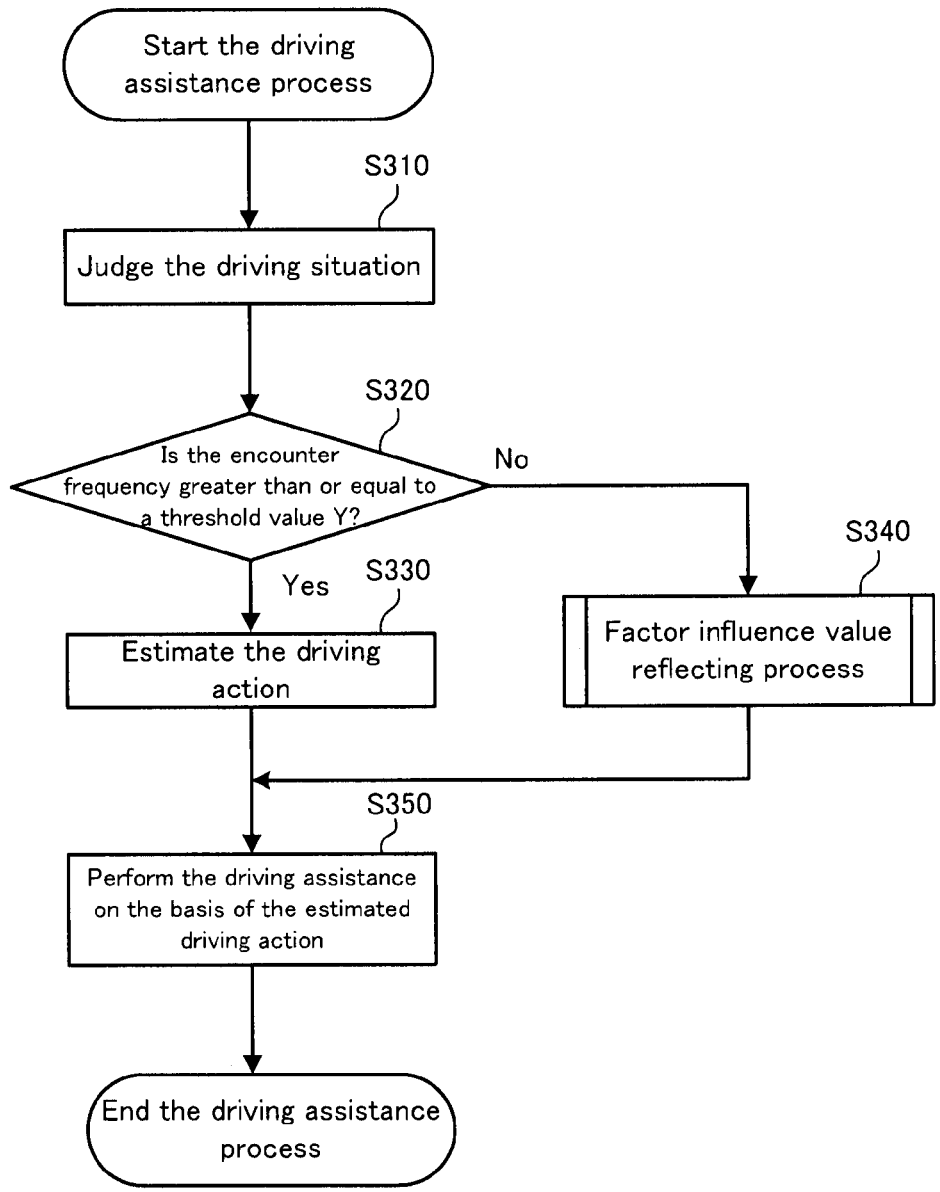
FIG. 7 is a flowchart showing a flow of a driving assistance process performed by the driving assistance apparatus in the first embodiment.

FIG. 7 is a flowchart showing a flow of the driving assistance process performed by the driving assistance apparatus in the embodiment.

As shown in FIG. 7, in the driving assistance process, firstly, the driving situation is judged (step S310). In other words, on the basis of the information obtained by the factor information obtaining part 100 (i.e. the driver information, the vehicle information, the road/structure information, and the driving environment information), it is judged by the driving action estimating part 220 whether or not the current driving situation of the self-vehicle is any of the plurality of driving situations (i.e. the plurality of past driving situations) stored on the action characteristic management table 900 (refer to FIG. 4). In other words, of the plurality of driving situations stored on the action characteristic management table 900, the driving situation that matches the current driving situation of the self-vehicle is selected by the driving action estimating part 220.

Then, it is judged whether or not the encounter frequency in the selected driving situation is greater than or equal to a threshold value Y (step S320). In other words, it is judged by the driving action estimating part 220 whether or not the encounter frequency corresponding to the driving situation selected as the driving situation that matches the current driving situation of the self-vehicle from the plurality of driving situations stored on the action characteristic management table 900 is greater than or equal to the threshold value Y (e.g. 10 times, etc.). In the example shown in FIG. 4, for example, if the third driving situation is selected as the driving situation that matches the current driving situation of the self-vehicle, it is judged whether or not the encounter frequency corresponding to the third driving situation, "Ac3", is greater than or equal to the threshold value Y.

If it is judged that the encounter frequency is greater than or equal to the threshold value Y (the step S320: Yes), the driving action is estimated (step S330). In other words, the future driving action of the self-vehicle is estimated by the driving action estimating part 220. Specifically, the driving action estimating part 220 estimates the future driving action of the driver of the self-vehicle on the basis of the action characteristic value corresponding to the driving situation selected as the driving situation that matches the current driving situation of the self-vehicle on the action characteristic management table 900. Here, as described above, the action characteristic value is a value indicating the action characteristic of the driver in the driving situation corresponding to the action characteristic value (e.g. a characteristic of having a tendency to perform an operation of accelerating the self-vehicle, a characteristic of performing an operation to make a right turn, etc.). Thus, the driving action estimating part 220 can accurately estimate the future driving action of the driver on the basis of the action characteristic value corresponding to the driving situation selected as the driving situation that matches the current driving situation of the self-vehicle. In other words, since the driving action estimating part 220 estimates the future driving action of the driver on the basis of the action characteristic value which meets the current driving situation out of a plurality of action characteristic values stored on the action characteristic management table 900, it can accurately estimate the future driving action of the driver. In the example shown in FIG. 4, for example, if the third driving situation is selected as the driving situation that matches the current driving situation of the self-vehicle, then, on the basis of the action characteristic value corresponding to the third driving situation, "A3", the future driving action of the driver is estimated by the driving action estimating part 220. Incidentally, the threshold value Y is one example of the "predetermined second reference frequency" of the present invention.

On the other hand, if it is judged that the encounter frequency is not greater than or equal to the threshold value Y (i.e. less than the threshold value Y) (the step S320: No), a factor influence value reflecting process is performed.

Figure 8:
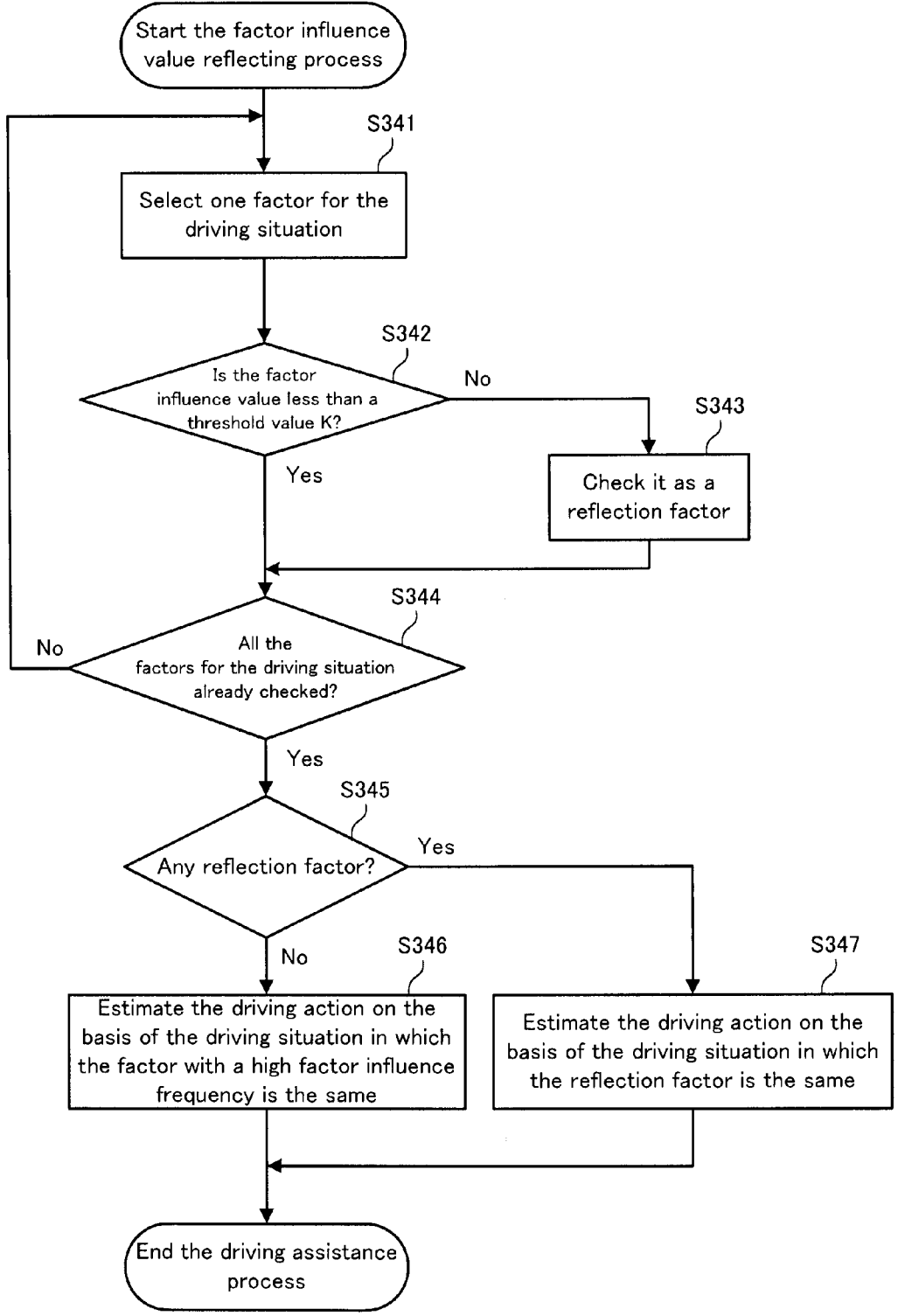
FIG. 8 is a flowchart showing a flow of a factor influence value reflecting process performed by the driving assistance apparatus in the first embodiment.

FIG. 8 is a flowchart showing a flow of the factor influence value reflecting process performed by the driving assistance apparatus in the embodiment. FIG. 9 is a schematic diagram showing one example of the action characteristic value, the encounter frequency, the factor influence value, and the factor influence frequency stored on the action characteristic management table.

As shown in FIG. 8, in the factor influence value reflecting process, firstly, one of the factors for the driving situation is selected (step S341). In other words, one of the plurality of factor information stored on the action characteristic management table 900 is selected by the driving action estimating part 220.

Then, it is judged whether or not the factor influence value of the selected factor information is less than a threshold value K (step S342). In other words, it is judged by the driving action estimating part 220 whether or not the factor influence value corresponding to the selected one factor information is less than the threshold value K on the action characteristic management table 900.

If it is judged that the factor influence value is less than the threshold value K (the step S342: Yes), it is judged whether or not all the factors for the driving situation are checked (step S344). In other words, regarding all the plurality of factor information stored on the action characteristic management table 900, it is judged by the driving action estimating part 220 whether or not the process operation in the step S341 described above (and the process operation in the step S342) is performed. Incidentally, the threshold value K is one example of the "predetermined reference influence value" of the present invention.

If it is judged that all the factors for the driving situation are not checked (the step S344; No), the process operation in the step S341 is performed again. In other words, the process operation in the step S341 and the process operation in the step S342 are performed in order one by one on all the plurality of factor information stored on the action characteristic management table 900.

On the other hand, if it is judged that the factor influence value is not less than the threshold value K (i.e. greater than the threshold value K) (the step S342: No), the selected one factor information is checked as a reflection factor (step S343). In other words, if the factor influence value corresponding to the one factor information selected by the process operation in the step S341 is greater than or equal to the threshold value K, the one factor information is selected by the driving action estimating part 220 as the reflection factor. In the example in FIG. 9, for example, if the threshold value K is set to be "high" and if the "speed limit" is selected as the one factor information by the process operation in the step S341, the factor influence value corresponding to the "speed limit" as the one factor information is "moderate (initial value)" and is less than the threshold value K. Thus, the "speed limit" as the one factor information is not selected as the reflection factor. Moreover, in the example in FIG. 9, for example, if the threshold value K is set to be "high" and if the "traffic light color" is selected as the one factor information by the process operation in the step S341, the factor influence value corresponding to the "traffic light color" as the one factor information is "high" and is greater than or equal to the threshold value K. Thus, the "traffic light color" as the one factor information is selected as the reflection factor. Incidentally, in the example in FIG. 9, the factor influence value adopts any of "low", "moderate" and "high", wherein "moderate" is a higher value than that of "low" and "high" is a higher value than that of "moderate".

Then, in FIG. 8, if it is judged that all the factors for the driving situation are checked (the step S344; Yes), it is judged there is the reflection factor (step S345). In other words, it is judged by the driving action estimating part 220 whether or not any of the plurality of factor information stored on the action characteristic management table 900 is selected as the reflection factor in the process operation in the step S343 described above.

If it is judged that there is the reflection factor (the step S345: Yes), the driving action is estimated by the driving action estimating part 220 on the basis of the driving situation in which the reflection factor is the same as that in the current driving situation (step S347). In other words, if the encounter frequency in the current driving situation is less than the threshold value Y (the step S320: No), the driving action estimating part 220 estimates the future driving action of the driver on the basis of the action characteristic value in the driving situation in which the factor information selected as the reflection factor in the process operation in the step S343 is the same as that in the current driving situation.

In the example in FIG. 9, for example, if the fourth driving situation (i.e. the driving situation in which the "speed limit" is 50 km/h, in which there is no "guardrail", in which the "road surface condition" is wet, and in which the "traffic light color" is red) is selected as the driving situation that matches the current driving situation of the self-vehicle, the encounter frequency corresponding to the fourth driving situation is "0 times", and thus it is less than the threshold value Y which is, for example, 10 times. Thus, the factor influence value reflecting process is performed (the step S340). In the example in FIG. 9, in the factor influence value reflecting process (more specifically, the process operation in the step S343 described above with reference to FIG. 8), the "traffic light color" which is the factor information is selected as the reflection factor on the basis of the factor influence value as described above (i.e. because the factor influence value is greater than or equal to the threshold value K). The driving action estimating part 220 estimates the future driving action of the driver on the basis of the action characteristic value in the second driving situation which is equal to the fourth driving situation as the current driving situation. Incidentally, in the example in FIG. 9, the "traffic light color" in each of the second driving situation and the fourth driving situation is "red", and they are equal to each other. Moreover, the encounter frequency in the second driving situation is "20 times", and it is greater than or equal to the threshold value Y which is, for example, 10 times.

In other words, particularly in the embodiment, if the encounter frequency in the current driving situation (the fourth driving situation in the example in FIG. 9) is less than the threshold value Y (e.g. 10 times), the driving action estimating part 220 estimates the future driving action of the driver on the basis of the action characteristic value in the driving situation (the second driving situation in the example in FIG. 9) in which the reflection factor with a factor influence value of the threshold value K or more (the "traffic light color" in the example in FIG. 9) is the same as that in the current driving situation and in which the encounter frequency is greater than or equal to the threshold value Y (e.g. 10 times), instead of the current driving situation.

Thus, since the driving action estimating part 220 estimates the driving action on the basis of another driving situation which is similar to the current driving situation and which provides a higher encounter frequency (e.g. the second driving situation in the example in FIG. 9) instead of the current driving situation (the fourth driving situation in the example in FIG. 9) which is predicted as a special (or rare) driving situation with a low encounter frequency, it is possible to estimate the future driving action of the driver, more accurately.

On the other hand, if it is judged that there is no reflection factor (the step S345: No), the driving action is estimated by the driving action estimating part 220 on the basis of the driving situation in which the factor with a high factor influence frequency is the same as that in the current driving situation (step S346). In other words, the driving action estimating part 220 estimates the future driving action of the driver on the basis of the action characteristic value in the driving situation in which the factor information providing the factor influence frequency that is greater than a predetermined threshold value (e.g. 15 times) is the same as that in the current driving situation.

In the example in FIG. 9, if the factor influence value of the "traffic light color" is "moderate" and if any of the factor influence values corresponding to the plurality of factor information stored on the action characteristic management table 900 is less than the threshold value K, none of the factor information is selected as the reflection factor and it is judged that there is no reflection factor (the step S345: No). In this case, the driving action estimating part 220 estimates the future driving action of the driver on the basis of the action characteristic value in the driving situation (e.g. the second driving situation in the example in FIG. 9) in which the factor information providing the factor influence frequency that is greater than the predetermined threshold value (e.g. 15 times), i.e. the "traffic light color", is the same as that in the current driving situation (e.g. the fourth driving situation in the example in FIG. 9).

Thus, since the driving action estimating part 220 estimates the driving action on the basis of another driving situation which is similar to the current driving situation and which provides a higher encounter frequency (e.g. the second driving situation in the example in FIG. 9) instead of the current driving situation (the fourth driving situation in the example in FIG. 9) which is predicted as a special (or rare) driving situation with a low encounter frequency, it is possible to estimate the future driving action of the driver, more accurately.

Again in FIG. 7, after the future driving action of the driver is estimated by the process operation in the step S330 and the process operation in the step 340 (i.e. the factor influence value reflecting process), the driving assistance is performed on the basis of the estimated driving action (step S350). In other words, on the basis of the driving action estimated by the driving action estimating part 220, the driving assistance is performed by the driving assistance performing part 230. Thus, it is possible to perform the driving assistance suitable for the future action of the driver of the self-vehicle.

In FIG. 2 again, after the driving assistance process (the step S300), the accumulating process is performed (the step S400).

Figure 10:
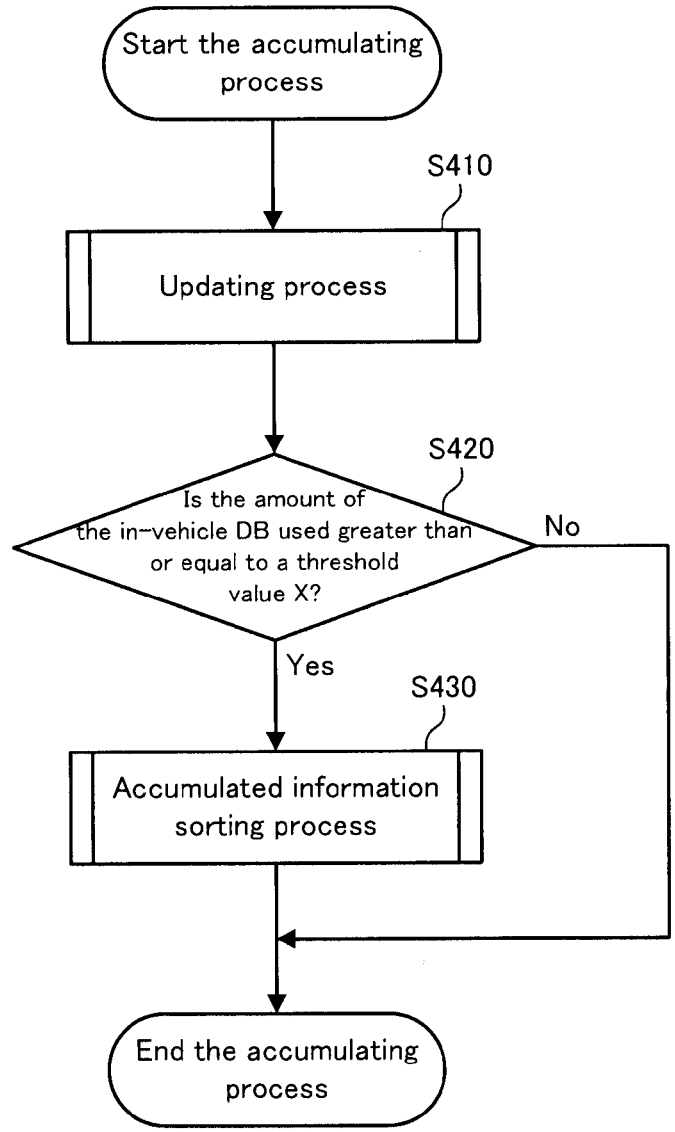
FIG. 10 is a flowchart showing a flow of an accumulating process performed by the driving assistance apparatus in the first embodiment.

FIG. 10 is a flowchart showing a flow of the accumulating process performed by the driving assistance apparatus in the embodiment.

As shown in FIG. 10, in the accumulating process, firstly, the updating process is performed (step S410).

Figure 11:
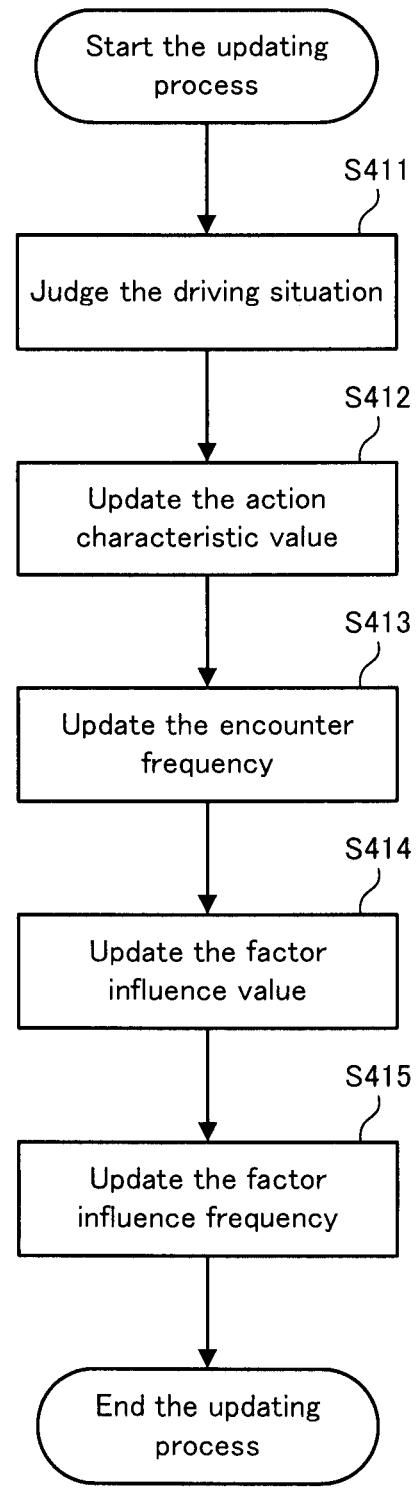
FIG. 11 is a flowchart showing a flow of an updating process performed by the driving assistance apparatus in the first embodiment.

FIG. 11 is a flowchart showing a flow of the updating process performed by the driving assistance apparatus in the embodiment.

As shown in FIG. 11, in the updating process, firstly, the driving situation is judged (step S411). In other words, on the basis of the information obtained by the factor information obtaining part 100 (i.e. the driver information, the vehicle information, the road/structure information, and the driving environment information), it is judged by the accumulation processing part 240 whether or not the current driving situation of the self-vehicle is any of the plurality of driving situations (i.e. the plurality of past driving situations) stored on the action characteristic management table 900. In other words, of the plurality of driving situations stored on the action characteristic management table 900, the driving situation that matches the current driving situation of the self-vehicle is selected by the accumulation processing part 240.

Then, the action characteristic value is updated (step S412). In other words, the action characteristic value corresponding to the selected driving situation is updated by the accumulation processing part 240. Specifically, the accumulation processing part 240 updates (or changes) the action characteristic value corresponding to the selected driving situation, on the basis of the information about the current driving situation obtained by the factor information obtaining part 100 (more specifically, the information about the driving action of the driver, such as a speed, acceleration/deceleration, an accelerator opening degree, a braking pressure, and a steering angle of the self-driver, in the current driving situation). In other words, the accumulation processing part 240 reflects the action characteristic of the driver in the current driving situation in the action characteristic value on the action characteristic management table 900.

Then, the encounter frequency is updated (step S413). In other words, the encounter frequency corresponding to the selected driving situation is updated by the accumulation processing part 240. Specifically, the accumulation processing part 240 raises (i.e. counts up) the encounter frequency corresponding to the selected driving situation, for example, once.

Then, the factor influence value is updated (step S414). In other words, the factor influence value stored on the action characteristic management table 900 is updated by the accumulation processing part 240. Specifically, the accumulation processing part 240 updates the factor influence value on the basis of the information about the current driving situation obtained by the factor information obtaining part 100. For example, regarding the factor information which changes between the current driving situation and the past driving situation, the accumulation processing part 240 specifies a change in the driving action of the driver due to the change in the factor information on the basis of the information obtained by the factor information obtaining part 100. Then, the accumulation processing part 240 changes the factor influence value in accordance with the specified change in the driving action.

Then, the factor influence frequency is updated (step S415). In other words, the factor influence frequency stored on the action characteristic management table 900 is updated by the accumulation processing part 240. Specifically, the accumulation processing part 240 updates the factor influence frequency on the basis of the information about the current driving situation obtained by the factor information obtaining part 100. For example, regarding the factor information which changes between the current driving situation and the past driving situation, the accumulation processing part 240 judges whether or not there is a change in the driving action of the driver due to the change in the factor information. If judging that there is the change, the accumulation processing part 240 raises (i.e. counts up) the factor influence frequency, for example, once.

In FIG. 10 again, after the updating process (the step S410), it is judged whether or not the amount of the in-vehicle database 211 used (refer to FIG. 1) is greater than or equal to a threshold value X (step S420). In other words, it is judged by the accumulation processing part 240 whether or not the amount of the in-vehicle database 211 used (in other words, the amount of the information stored in the in-vehicle database 211) by the information stored in the in-vehicle database 211 (e.g. the information about the driving situation, etc.) is greater than or equal to the threshold value X. Incidentally, the threshold value X is one example of the "predetermined reference information amount" of the present invention.

If it is judged that the amount of the in-vehicle database 211 used is not greater than or equal to the threshold value X (i.e. less than the threshold value X) (the step 420: No), the accumulation process is ended. If it is judged that the amount of the in-vehicle database 211 used is greater than or equal to the threshold value X (the step 420: Yes), the accumulated information sorting process is performed (step S430).

Figure 12:
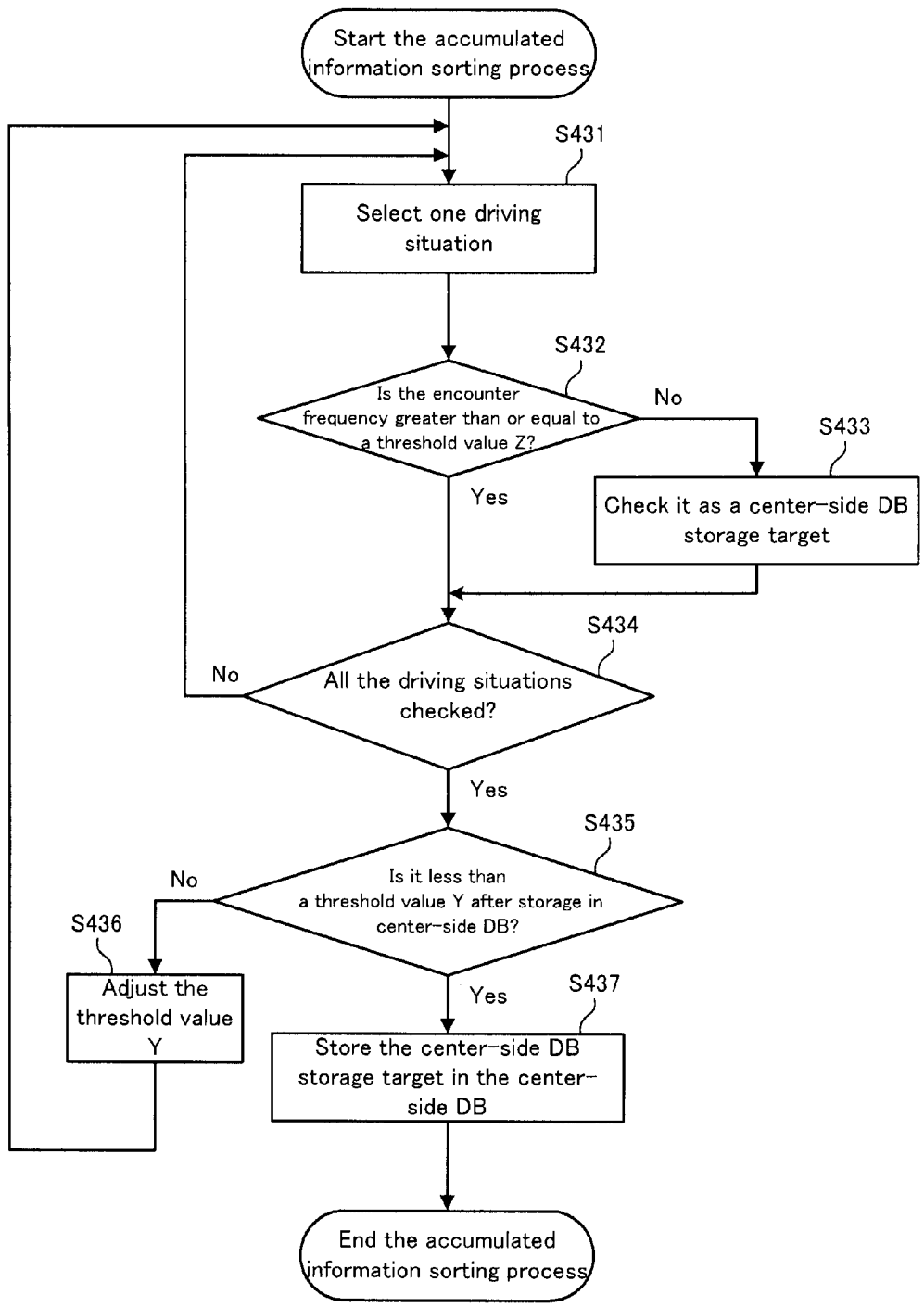
FIG. 12 is a flowchart showing a flow of an accumulated information sorting process performed by the driving assistance apparatus in the first embodiment.

FIG. 12 is a flowchart showing a flow of the accumulated information sorting process performed by the driving assistance apparatus in the embodiment. FIG. 13 is a schematic diagram showing one example of the action characteristic value, the encounter frequency, the factor influence value, and the factor influence frequency stored on the action characteristic management table.

As shown in FIG. 12, in the accumulated information sorting process, firstly, one of the driving situations is selected (step S431). In other words, one of the plurality of driving situations stored on the action characteristic management table 900 is selected by the accumulation processing part 240.

Then, it is judged whether or not the encounter frequency in the selected driving situation is greater than or equal to a threshold value Z (step S432). In other words, it is judged by the accumulation processing part 240 whether or not the encounter frequency corresponding to the selected driving situation is greater than or equal to the threshold value Z (e.g. 10 times, etc.). Incidentally, the threshold value Z is one example of the "predetermined first reference frequency" of the present invention.

If it is judged that the encounter frequency is greater than or equal to the threshold value Z (the step S432: Yes), it is judged whether or not all the driving situations are checked (step S434). In other words, regarding all the plurality of driving situations stored on the action characteristic management table 900, it is judged by the accumulation processing part 240 whether or not the process operation in the step S431 described above (and the process operation in the step S432) is performed.

If it is judged that all the driving situations are not checked (the step S434; No), the process operation in the step S431 is performed again. In other words, the process operation in the step S431 and the process operation in the step S432 are performed in order one by one on all the plurality of driving situations stored on the action characteristic management table 900.

If it is judged that the encounter frequency is not greater than or equal to the threshold value Z (the step S432: No), the selected one driving situation is checked as a center-side database storage target. In other words, if the encounter frequency corresponding to the one driving situation selected by the process operation in the step 431 is greater than or equal to the threshold value Z, the one driving situation is selected by the accumulation processing part 240 as the center-side database storage target. In the example in FIG. 13, for example, if the threshold value Z is set to be "10 times" and if the first driving situation is selected as the one driving situation by the process operation in the step S431, the encounter frequency corresponding to the first driving situation is "30 times" and is greater than or equal to the threshold value Z. Thus, the first driving situation is not selected as the center-side database storage target. If the threshold value Z is set to be "10 times", the second driving situation and the third driving situation are also not selected as the center-side database storage target either. Moreover, in the example in FIG. 13, if the threshold value Z is set to "10 times" and if the fourth driving situation is selected as the one driving situation by the process operation in the step S431, the encounter frequency corresponding to the fourth driving situation is "0 times" and is not greater than or equal to the threshold value K. Thus, the fourth driving situation is selected as the center-side database storage target.

If it is judged that all the driving situations are checked (the step S434; Yes), it is judged by the accumulation processing part 240 whether or not the amount of the in-vehicle database 211 used is less than a threshold value Y in a case where the information about the driving situation selected as the center-side database storage target is transferred from the in-vehicle database 211 to the center-side database 212 (refer to FIG. 1) (step S435).

If it is judged that the amount of the in-vehicle database 211 used is not less than the threshold value Y (the step S435: No), the threshold value Y is adjusted (step S436). Specifically, the threshold value Y is adjusted by the accumulation processing part 240 to have a greater value than a current value. For example, if the amount of the in-vehicle database 211 used is 3.5 gigabytes in the case where the information about the driving situation selected as the center-side database storage target is transferred from the in-vehicle database 211 to the center-side database 212 (refer to FIG. 1) and if the current value of the threshold value Y is 3.0 gigabytes, the threshold value Y is changed by the accumulation processing part 240, for example, to 4.0 gigabytes, which is greater than a current value of 3.5 gigabytes. Incidentally, at this time, the threshold value Z may be also adjusted by the accumulation processing part 240.

After the process operation in the step S436, the process operation in the step S431 is performed again.

On the other hand, if it is judged that the amount of the in-vehicle database 211 used is less than the threshold value Y (the step S435: Yes), the information about the driving situation selected as the center-side database storage target is transferred from the in-vehicle database 211 to the center-side database 212 by the accumulation processing part 240 (step S437).

As described above, particularly in the embodiment, the information associated with the plurality of driving situations can be distributed and stored in the in-vehicle database 211 and the center-side database 212. Moreover, since the information about the driving situation in which the encounter frequency is greater than the threshold value Z is stored in the in-vehicle database 211 and the information about the driving situation in which the encounter frequency is less than the threshold value Z is stored in the center-side database 212, the driving action estimating part 220 or the like can quickly refer to the information about the driving situation with a high encounter frequency (i.e. it is possible to reduce an access time necessary for the driving action estimating part 220 or the like to access the information about the driving situation with a high encounter frequency). At the same time, it is possible to avoid a situation in which the information about the driving situation regularly or irregularly obtained by the factor information obtaining part 100 cannot be added due to too much information stored in the in-vehicle database 211.

Incidentally, in the embodiment, the information about the driving situation obtained by the factor information obtaining part 100 is firstly stored in the in-vehicle database 211. Then, of the information stored in the in-vehicle database 211, the information about the driving situation in which the encounter frequency is less than the threshold value Z is stored in the center-side database 212 by the accumulated information sorting process described above. However, as a modified example, for example, the information about the driving situation obtained by the factor information obtaining part 100 may be firstly stored in the center-side database 212. Then, of the information about the driving situation obtained by the factor information obtaining part 100 stored in the center-side database 212, the driving situation in which the encounter frequency is greater than a predetermined threshold value may be stored in the in-vehicle database 211. Even in this case, the information associated with the plurality of driving situations can be distributed and stored in the in-vehicle database 211 and the center-side database 212.

In FIG. 10 again, if the accumulated information sorting process (the step S430) is ended, the accumulating process is ended.

In FIG. 2 again, after the accumulating process (the step S400), it is judged whether or not the driving assistance is to be ended (step S500). In other words, it is judged by the driving assistance part 200 whether or not the driving assistance for the driver of the self-vehicle is to be ended.

If it is judged that the driving assistance is to be ended (the step S500: Yes), the driving assistance by the driving assistance apparatus 1 is ended.

If it is judged that the driving assistance is not to be ended (i.e. that the driving assistance is to be continued) (the step S500: No), the factor information obtaining process (the step S100) is performed again.

As explained above, according to the driving assistance apparatus 1 in the embodiment, the future driving action of the driver can be accurately estimated by the driving action estimating part 220, and the driving assistance can be appropriately performed by the driving action performing part 230. Moreover, according to the driving assistance apparatus 1 in the embodiment, by virtue of the accumulated information sorting process, it is possible to reduce the access time necessary to access the information about the driving situation with a high encounter frequency. At the same time, it is possible to avoid the situation in which the information about the driving situation obtained by the factor information obtaining part 100 cannot be added to the in-vehicle database 211 due to too much information stored in the in-vehicle database 211. In addition, according to the driving assistance apparatus 1 in the embodiment, the reliability is set by the reliability setting part 250 for the another vehicle estimation result information. Thus, the future driving action of the driver can be estimated by the driving action estimating part 220, more accurately.

Second Operation Example

Next, a second operation example of the driving assistance apparatus in the embodiment will be explained with reference to FIG. 14 and FIG. 15. Hereinafter, as the second operation example of the driving assistance apparatus in the embodiment, the driving assistance at an intersection with a stop sign will be explained.

Figure 14:
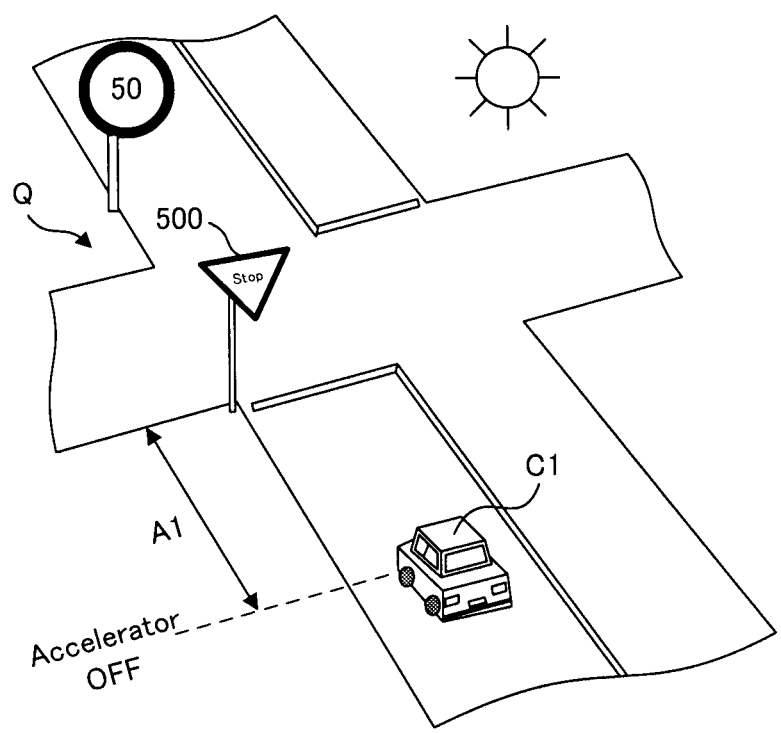
FIG. 14 is a schematic diagram for explaining the driving assistance at an intersection with a stop sign.

FIG. 14 is a schematic diagram for explaining the driving assistance at the intersection with the stop sign.

FIG. 14 shows a case where the driver of a self-vehicle C1 makes an accelerator OFF a distance A1 from the stop line of an intersection Q in a driving situation in which the self-vehicle C1 drives toward the intersection Q with a stop sign 500. Incidentally, in FIG. 14, the time period is the daytime (e.g. from 1000 to 1700 hours) and the weather is fine (sunny). FIG. 14 schematically shows a first driving situation stored on the action characteristic management table 900 shown in FIG. 15 described later.

FIG. 15 is a schematic diagram showing an action characteristic management table in the second operation example of the driving assistance apparatus in the embodiment.

In the example in FIG. 15, as the factor information, information about the intersection, information about the time period, and information about the weather are shown. The information about one driving situation is stored on the action characteristic management table 900 as a group of the plurality of factor information including the information about the intersection, the information about the time period, and the information about the weather. In the example in FIG. 15, information about each of the first driving situation (i.e. the driving situation shown in FIG. 14), a second driving situation, a third driving situation and a fourth driving situation is stored on the action characteristic management table 900. Here, in the first driving situation, the self-vehicle C1 drives toward the intersection Q, the time period is the daytime, and the weather is fine (sunny). In the second driving situation, the self-vehicle C1 drives toward the intersection Q, the time period is the daytime, and the weather is bad (rainy). In the third driving situation, the self-vehicle C1 drives toward the intersection Q, the time period is the nighttime (e.g. 1700 to 2400 hours, or 000 to 300 hours), and the weather is fine (sunny). In the fourth driving situation, the self-vehicle C1 drives toward the intersection Q, the time period is the nighttime, and the weather is bad (rainy). Here, in the example in FIG. 15, as the action characteristic value, there is stored a distance between the stop line of the intersection Q and a position at which the driver of the self-vehicle C1 makes the accelerator OFF (hereinafter referred to as an "accelerator OFF remaining distance", as occasion demands). In the example in FIG. 15, 100 m is stored as an action characteristic value A1 corresponding to the first driving situation (i.e. the accelerator OFF remaining distance corresponding to the first driving situation is 100 m), 105 m is stored as an action characteristic value A2 corresponding to the second driving situation (i.e. the accelerator OFF remaining distance corresponding to the second driving situation is 105 m), 150 m is stored as an action characteristic value A3 corresponding to the third driving situation (i.e. the accelerator OFF remaining distance corresponding to the third driving situation is 150 m), and the initial value of zero (0) is stored as an action characteristic value corresponding to the fourth driving situation (i.e. the encounter frequency in the fourth driving situation is 0).

Here, in the judgment about the driving situation (refer to the step S310 in FIG. 7), if the driving action estimating part 220 judges that the current driving situation of the self-vehicle C1 matches the fourth driving situation in which the encounter frequency shown in FIG. 15 is 0 times, the future action of the driver of the self-vehicle C1 may be estimated in the following manner.

In other words, the driving action estimating part 220 firstly specifies action determining factor information which determines the action of the driver of the self-vehicle C1 (in other words, basis factor information which is a basis for the action of the driver of the self-vehicle C1) from the plurality of factor information, on the basis of the information about the plurality of past driving situations (i.e. the first, second, and third driving situations), the action characteristic value, the encounter frequency, the factor influence value, and the factor influence frequency which are stored on the action characteristic management table 900 shown in FIG. 15. Specifically, for example, the driving action estimating part 220 specifies as the action determining factor information the factor information with the largest factor influence value (in the example in FIG. 15, the information about the time period). Alternatively, for example, the driving action estimating part 220 specifies the action determining factor information on the basis of the information about the plurality of past driving situations (i.e. the first, second, and third driving situations) and the action characteristic value corresponding to each driving situation. For example, as shown in FIG. 15, if a difference between the action characteristic values corresponding to the first and third driving situations which are different only in the time period (or a difference between the action characteristic values corresponding to the second and fourth driving situations which are different only in the time period) is greater than a difference between the action characteristic values corresponding to the first and second driving situations which are different only in the weather, the information about the time period is specified as the action determining factor information. Alternatively, if the difference between the action characteristic values corresponding to the first and second driving situations which are different only in the weather (or a difference between the action characteristic values corresponding to the third and fourth driving situations which are different only in the weather) is greater than the difference between the action characteristic values corresponding to the first and third driving situations which are different only in the time period (or the difference between the action characteristic values corresponding to the second and fourth driving situations which are different only in the time period), the information about the weather is specified as the action determining factor information.

Then, the driving action estimating part 220 estimates the future action of the driver (in this operation example, the accelerator OFF remaining distance) in a case where the current driving situation of the self-vehicle C1 is the fourth driving situation (the driving situation with an encounter frequency of 0 times) on the basis of the information about the plurality of past driving situations (i.e. the first, second, and third driving situations), the action characteristic value, and the specified action determining factor information which are stored on the action characteristic management table 900 shown in FIG. 15. In other words, the driving action estimating part 220 estimates the action characteristic value corresponding to the third driving situation in which the information about the time period is the same as that in the fourth driving situation, as the future driving action of the self-vehicle C1 in the fourth driving situation, on the basis of the fact that the action determining factor information is the information about the time period; namely, the driving action estimating part 220 estimates that the accelerator OFF remaining distance in the fourth driving situation is substantially the same as that in the third driving situation, on the basis of the fact that the information about the time period, which is the action determining factor information, is the same in the third and fourth driving situations. Thus, it is possible to accurately estimate the future action of the driver in the case where the current driving situation of the self-vehicle C1 provides an encounter frequency of 0 times.

In accordance with the driving action estimated in this manner, the driving assistance for the driver of the self-vehicle C1 is performed by the driving assistance performing part 230. Thus, it is possible to perform the driving assistance more suitable for the future driving action of the driver in the driving situation with an encounter frequency of 0 times.

Third Operation Example

Next, a third operation example of the driving assistance apparatus in the embodiment will be explained with reference to FIG. 16 and FIG. 17. Hereinafter, as the third operation example of the driving assistance apparatus in the embodiment, the driving assistance in a case where the self-vehicle drives from a first intersection to a second intersection will be explained.

Figure 16:
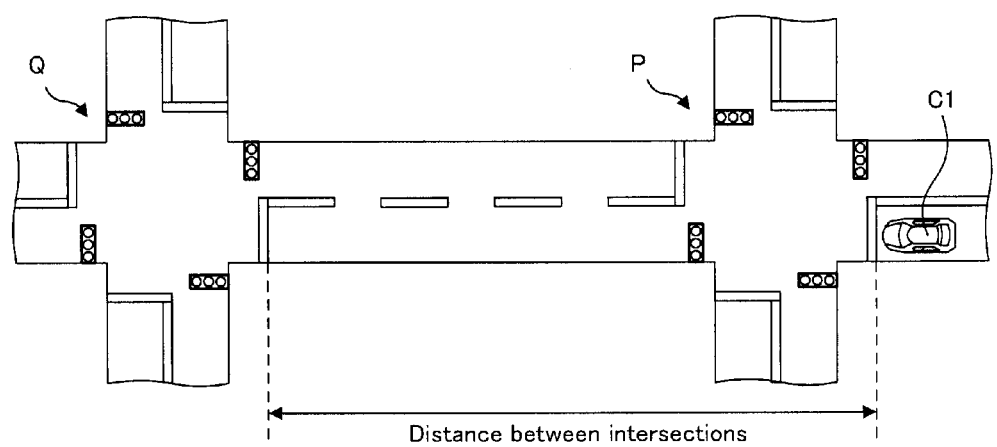
FIG. 16 is a schematic diagram for explaining the driving assistance in a case where a self-vehicle drives from a first intersection to a second intersection.

FIG. 16 is a schematic diagram for explaining the driving assistance in the case where the self-vehicle drives from the first intersection to the second intersection.

FIG. 17 is a schematic diagram showing an action characteristic management table in the third operation example of the driving assistance apparatus in the embodiment.

In the example in FIG. 17, as the factor information, information about a speed limit, information about a distance between intersections, information about a road surface condition, information about a traffic light color, information about the weather, and information about another vehicle are shown. The information about one driving situation is stored on the action characteristic management table 900 as a group of the plurality of factor information including the information about the speed limit, the information about the distance between the intersections, the information about the road surface condition, the information about the traffic light color, the information about the weather, and the information about another vehicle. Here, the distance between the intersections is a distance between a first intersection P and a second intersection Q (i.e. a distance between an intersection at which the self-vehicle C1 currently stops and a next intersection) (refer to FIG. 16).

On the action characteristic management table 900 shown in FIG. 17, information about each of a first driving situation, a second driving situation, a third driving situation and a fourth driving situation is stored. Here, in the first driving situation, the speed limit on the road is 60 km/h, the distance between the intersections is 100 m, the road surface condition is dry, the traffic light color is red, the weather is fine (sunny), and there is no other vehicle. In the second driving situation, the speed limit on the road is 60 km/h, the distance between the intersections is 200 m, the road surface condition is dry, the traffic light color is red, the weather is fine (sunny), and there is no other vehicle. In the third driving situation, the speed limit on the road is 60 km/h, the distance between the intersections is 400 m, the road surface condition is dry, the traffic light color is red, the weather is fine (sunny), and there is no other vehicle. In the fourth driving situation, the speed limit on the road is 60 km/h, the distance between the intersections is 600 m, the road surface condition is dry, the traffic light color is red, the weather is fine (sunny), and there is no other vehicle. Here, in the example in FIG. 17, as the action characteristic value, there is stored a transition action which is an action after the self-vehicle C1 starts to accelerate from the first intersection P. In the example in FIG. 17, as the action characteristic value corresponding to the first driving situation, the deceleration and stop of the self-vehicle C1 (hereinafter referred to as a "deceleration/stop action" as occasion demands) is stored. As the action characteristic value corresponding to the second driving situation, the deceleration/stop action is stored. As the action characteristic value corresponding to the third driving situation, the cruising or steady-state driving of the self-vehicle C1 (which is namely driving at a constant speed and which is hereinafter referred to as a "cruising action" as occasion demands) is stored. As the action characteristic value corresponding to the fourth driving situation, the cruising action is stored.

Here, the driving assistance performing part 230 may also perform the driving assistance in accordance with the transition action stored as the action characteristic value when performing the driving assistance for the self-vehicle C1 starting to accelerate from the intersection P. In other words, when the driving assistance performing part 230 performs the driving assistance in accordance with a first driving action in which the self-vehicle C1 starts to accelerate from the intersection P (hereinafter referred to as a "start/acceleration action" as occasion demands) and which is estimated by the driving action estimating part 220, the driving assistance performing part 230 may also perform the driving assistance in accordance with a second driving action (i.e. the transition action) which is estimated by the driving action estimating part 220 as being performed after the first driving action. In other words, in the example in FIG. 17, for example, if the current driving situation of the self-vehicle C1 is the first driving situation, the driving action estimating part 220 estimates the deceleration/stop action as the transition action, and the driving assistance performing part 230 performs the driving assistance in accordance with the deceleration/stop action in addition to the start/acceleration action. Thus, it is possible to perform the driving assistance more suitable for a series of driving actions of the driver which consists of the start/acceleration action and the deceleration/stop action and which is performed between the first intersection P and the second intersection Q.

Fourth Operation Example

Next, a fourth operation example of the driving assistance apparatus in the embodiment will be explained with reference to FIG. 16 and FIG. 18. Hereinafter, as the fourth operation example of the driving assistance apparatus in the embodiment, one example of the estimation of the driving action in a case where the self-vehicle drives from a first intersection to a second intersection will be explained.

FIG. 18 is a schematic diagram showing an action characteristic management table in the fourth operation example of the driving assistance apparatus in the embodiment.

In the example in FIG. 18, as the factor information, information about a speed limit, information about a distance between intersections, information about a road surface condition, information about a traffic light color, information about the weather, and information about a time period are shown. The information about one driving situation is stored on the action characteristic management table 900 as a group of the plurality of factor information including the information about the speed limit, the information about the distance between the intersections, the information about the road surface condition, the information about the traffic light color, the information about the weather, and the information about the time period. Here, the distance between the intersections is a distance between the first intersection P and the second intersection Q (refer to FIG. 16).

On the action characteristic management table 900 shown in FIG. 18, information about each of a first driving situation, a second driving situation, a third driving situation and a fourth driving situation is stored. Here, in the first driving situation, the speed limit on the road is 60 km/h, the distance between the intersections is 600 m, the road surface condition is dry, the traffic light color is red, the weather is fine (sunny), and the time period is the daytime. In the second driving situation, the speed limit on the road is 60 km/h, the distance between the intersections is 400 m, the road surface condition is dry, the traffic light color is red, the weather is fine (sunny), and the time period is the daytime In the third driving situation, the speed limit on the road is 60 km/h, the distance between the intersections is 200 m, the road surface condition is dry, the traffic light color is red, the weather is fine (sunny), and the time period is the daytime. In the fourth driving situation, the speed limit on the road is 60 km/h, the distance between the intersections is 100 m, the road surface condition is dry, the traffic light color is red, the weather is fine (sunny), and the time period is the daytime. Here, in the example in FIG. 18, as the action characteristic value, there are stored top vehicle speed characteristics exhibited after the self-vehicle C1 starts to accelerate from the first intersection P (i.e. a top vehicle speed, a top vehicle speed reaching distance which is a distance that the self-vehicle C1 drives until reaching the top vehicle speed, and a top vehicle speed reaching time which is a time until reaching the top vehicle speed). In the example in FIG. 18, as the action characteristic value corresponding to the first driving situation, there are stored a top vehicle speed of 55 km/h, a top vehicle speed reaching distance of 120 to 440 m, and a top vehicle speed reaching time of 17 to 36 seconds. As the action characteristic value corresponding to the second driving situation, there are stored a top vehicle speed of 55 km/h, a top vehicle speed reaching distance of 135 to 250 m, and a top vehicle speed reaching time of 14-21 seconds. As the action characteristic value corresponding to the third driving situation, there are stored a top vehicle speed of 44 km/h, a top vehicle speed reaching distance of 66 to 110 m, and a top vehicle speed reaching time of 10 to 12 seconds. As the action characteristic value corresponding to the fourth driving situation, there are stored a top vehicle speed of 34 km/h, a top vehicle speed reaching distance of 36 to 50 m, and a top vehicle speed reaching time of 8 to 9 seconds.

Here, the driving action estimating part 220 may also estimate the driving action performed after the self-vehicle C1 starts to accelerate at the first intersection P, on the basis of the top vehicle speed reaching time stored as the action characteristic value on the action characteristic management table 900 shown in FIG. 18. Here, according to a study by the present inventors, for example, it is found that the driving action performed after the self-vehicle C1 starts to accelerate from the first intersection P to the second intersection Q tends to be strongly related to the top vehicle speed reaching time, i.e. that the top vehicle speed reaching time can be a preferable basis or ground in estimating the driving action performed after the self-vehicle C1 starts to accelerate from the first intersection P to the second intersection Q. For example, regarding the driving action performed after the self-vehicle C1 starts to accelerate from the first intersection P to the second intersection Q, it is found that a longer top vehicle speed reaching time more likely results in the cruising action and that a shorter top vehicle speed reaching time more likely results in the deceleration/stop action. Thus, the driving action performed after the self-vehicle C1 starts to accelerate at the intersection P can be accurately estimated by the driving action estimating part 220 on the basis of the top vehicle speed reaching time.

Fifth Operation Example

Next, a fifth operation example of the driving assistance apparatus in the embodiment will be explained with reference to FIG. 1. Hereinafter, as the fourth operation example of the driving assistance apparatus in the embodiment, the obtainment of the information about the current driving situation of the self-vehicle will be explained.

As described above with reference to FIG. 1, the factor information obtaining part 100 can obtain the information about the driving situation of the self-vehicle (in other words, the plurality of factor information). Incidentally, the factor information obtaining part 100 is one example of the "obtaining device" of the present invention.

Here, the factor information obtaining part 100 may obtain each of the plurality of factor information about the vehicle at the current time, in each period according to a rate of change at which each of the plurality of factor information changes. In other words, the factor information obtaining part 100 obtains the factor information with a relatively low rate of change (e.g. the information about the weather, etc.) out of the plurality of factor information in each period that is relatively long and obtains a driving situation factor with a relatively high rate of change (e.g. information about the vehicle speed, etc.) out of the plurality of factor information in each period that is relatively short. Thus, it is possible to reduce that the factor information with a relatively low rate of change (i.e. the factor information that hardly changes or does not change at all in a relatively long time) is uselessly obtained, and it is also possible to certainly obtain the factor information with a relatively high rate of change (i.e. the factor information that changes in a relatively short time). Therefore, it is possible to accurately estimate the driving action while reducing the useless obtainment of the current factor information.

Incidentally, a time interval at which each factor information is obtained (i.e. a period between when the factor information is obtained and when the factor information is obtained again) may be adjusted on the basis of the factor influence value. For example, in the case of the factor information in which the rate of change is relatively high but whose factor influence value is relatively small (i.e. which has a relatively small influence on the action characteristic of the driver), the time interval at which the factor information is obtained may be set to be relatively long. By such a configuration, the useless obtainment of the factor information can be further reduced.

The present invention is not limited to the aforementioned embodiment, but various changes may be made, if desired, without departing from the essence or spirit of the invention which can be read from the claims and the entire specification. A driving assistance apparatus, which involves such changes, is also intended to be within the technical scope of the present invention.

DESCRIPTION OF REFERENCE CODES 1 driving assistance apparatus
100 factor information obtaining part
110 driver information obtaining part
120 vehicle information obtaining part
130 road/structure information obtaining part
140 driving environment information obtaining part
200 driving assistance part
210 factor information storing part
211 in-vehicle database
212 center-side database
220 driving action estimating part
230 driving assistance performing part
240 accumulation processing part
250 reliability setting part 250.

The invention claimed is:

1. A driving assistance apparatus, mounted on a self-vehicle, for performing driving assistance for a driver of the self-vehicle, said driving assistance apparatus comprising:
a storing device for storing each of a plurality of past driving situations of the self-vehicle as a group of a plurality of driving situation factors, for storing, correspondingly to each of the plurality of past driving situations, an action characteristic value indicating an action characteristic of the driver in the past driving situation and a driving situation occurrence frequency indicating a frequency at which the past driving situation occurs, and for storing, correspondingly to each of the plurality of driving situation factors, a factor influence value indicating extent of an influence of the driving situation factor on the action characteristic and a factor change frequency indicating a frequency at which the driving situation factor changes;
an estimating device for estimating a future driving action of the driver on the basis of the plurality of past driving situations, the action characteristic value, the driving situation occurrence frequency, the factor influence value, and the factor change frequency;
a performing device for performing the driving assistance in accordance with the estimated driving action; and
an information transferring device for transferring to a remote database a past driving situation in which the driving situation occurrence frequency is less than a predetermined first reference frequency out of the plurality of past driving situations stored in an in-vehicle database if an information amount associated with the plurality of past driving situations, the action characteristic value, the driving situation occurrence frequency, the factor influence value, and the factor change frequency, which are stored in the in-vehicle database, is greater than or equal to a predetermined reference information amount.

2. The driving assistance apparatus according to claim 1, wherein said storing device includes the in-vehicle database, mounted on the self-vehicle, and the remote database, disposed at a different place from the self-vehicle, as a storage destination for storing the plurality of past driving situations, the action characteristic value, the driving situation occurrence frequency, the factor influence value, and the factor change frequency.

3. The driving assistance apparatus according to claim 1, wherein when estimating the driving action on the basis of one past driving situation in which the driving situation occurrence frequency is less than a predetermined second reference frequency out of the plurality of past driving situations, said estimating device estimates the driving action on the basis of another past driving situation in which a driving situation factor providing the factor influence value that is greater than a predetermined threshold value out of the plurality of driving situation factors is the same as that in the one past driving situation and in which the driving situation occurrence frequency is greater than the predetermined second reference frequency, instead of the one past driving situation.

4. The driving assistance apparatus according to claim 1, wherein
said estimating device estimates as the driving action a first driving action and a second driving action performed after the first driving action, and
said performing device performs the driving assistance in accordance with the estimated first and second driving actions.

5. The driving assistance apparatus according to claim 1, wherein
said storing device stores as the action characteristic value a top vehicle speed reaching time which is a time from when the self-vehicle starts to accelerate to when the self-vehicle reaches a top vehicle speed, and
said estimating device estimates a driving action performed after the self-vehicle starts to accelerate, on the basis of the top vehicle speed reaching time.

6. The driving assistance apparatus according to claim 1, further comprising an obtaining device for obtaining each of the plurality of driving situation factors of the self-vehicle at a current time in each period according to a rate of change at which each of the plurality of driving situation factors changes.

* * * * *